(12) United States Patent
Burke

(10) Patent No.: US 12,091,632 B2
(45) Date of Patent: **\*Sep. 17, 2024**

(54) SYSTEMS AND METHODS FOR REMOVING MICRO-PARTICLES FROM A METALWORKING FLUID

(71) Applicant: Quaker Chemical Corporation, Wilmington, DE (US)

(72) Inventor: John Michael Burke, Concord Township, OH (US)

(73) Assignee: Quaker Chemical Corporation, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/048,540

(22) Filed: Oct. 21, 2022

(65) Prior Publication Data

US 2023/0348812 A1 Nov. 2, 2023

Related U.S. Application Data

(63) Continuation of application No. 17/733,144, filed on Apr. 29, 2022.

(51) Int. Cl.
*C10M 177/00* (2006.01)
*B03D 1/02* (2006.01)
(Continued)

(52) U.S. Cl.
CPC .......... *C10M 177/00* (2013.01); *B03D 1/025* (2013.01); *B03D 1/1431* (2013.01);
(Continued)

(58) Field of Classification Search
None
See application file for complete search history.

(56) References Cited

U.S. PATENT DOCUMENTS

| 4,492,636 A | 1/1985 | Burke |
| 4,535,943 A | 8/1985 | Couture |

(Continued)

FOREIGN PATENT DOCUMENTS

| WO | 2001045818 A1 | 6/2001 |
| WO | 2019211481 A1 | 11/2019 |

OTHER PUBLICATIONS

International Search Report and Written Opinion for related International Application No. PCT/US22/26970 dated Jul. 27, 2022, 13 pages.

*Primary Examiner* — Peter Keyworth
(74) *Attorney, Agent, or Firm* — Morgan, Lewis & Bockius LLP

(57) ABSTRACT

A method of removing metal particles from a contaminated metalworking fluid comprising emulsion droplets and metal particles includes pressurizing a first clean metalworking fluid with gas to provide an aerated metalworking fluid; releasing the pressure of the aerated metalworking fluid to form a plurality of bubbles; applying a shear force to the contaminated metalworking fluid to separate the emulsion droplets from the metal particles; flowing the contaminated metalworking fluid with the aerated metalworking fluid in a laminar flow to form a combined fluid, wherein the flowing occurs during the formation of the plurality of bubbles and while the emulsion droplets are separated from the metal particles, and wherein the laminar flow lasts for a time sufficient for the plurality of bubbles to attach to the metal particles; releasing the combined fluid into a flotation tank; and removing the metal particles to form a second clean metalworking fluid.

17 Claims, 19 Drawing Sheets

High Hydraulic Shear Force Application

(51) Int. Cl.
*B03D 1/14* (2006.01)
*B03D 1/24* (2006.01)
*B23Q 11/10* (2006.01)
*C10M 173/00* (2006.01)
*C10N 40/20* (2006.01)

(52) U.S. Cl.
CPC ........... *B03D 1/1456* (2013.01); *B03D 1/247* (2013.01); *B23Q 11/10* (2013.01); *C10M 173/00* (2013.01); *B23Q 11/1069* (2013.01); *C10M 2201/02* (2013.01); *C10M 2203/003* (2013.01); *C10N 2040/245* (2020.05)

(56) References Cited

U.S. PATENT DOCUMENTS

| | | |
|---|---|---|
| 5,137,654 A | 8/1992 | Burke |
| 2016/0326017 A1 | 11/2016 | Cross et al. |
| 2021/0017263 A1 | 1/2021 | Miura et al. |

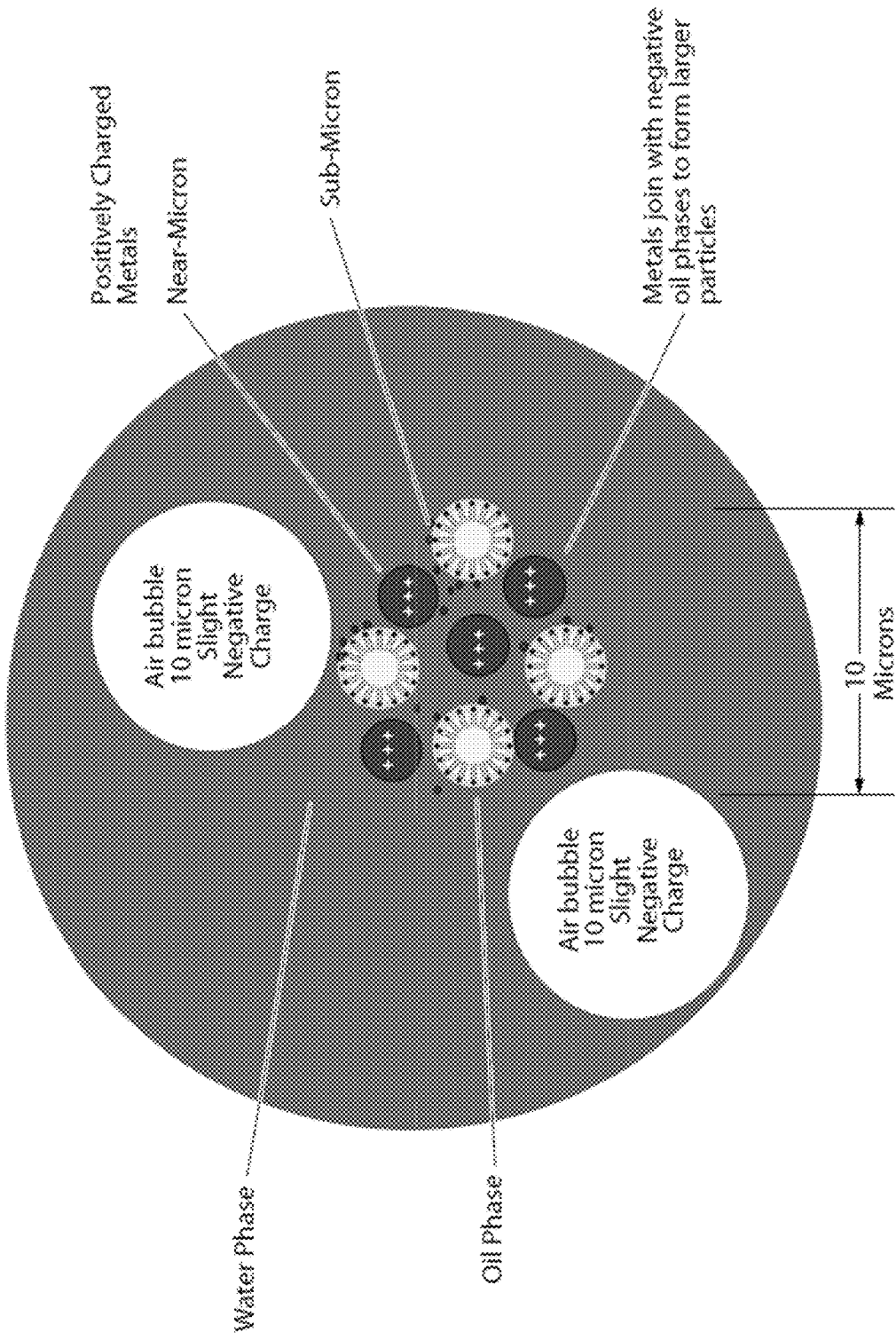

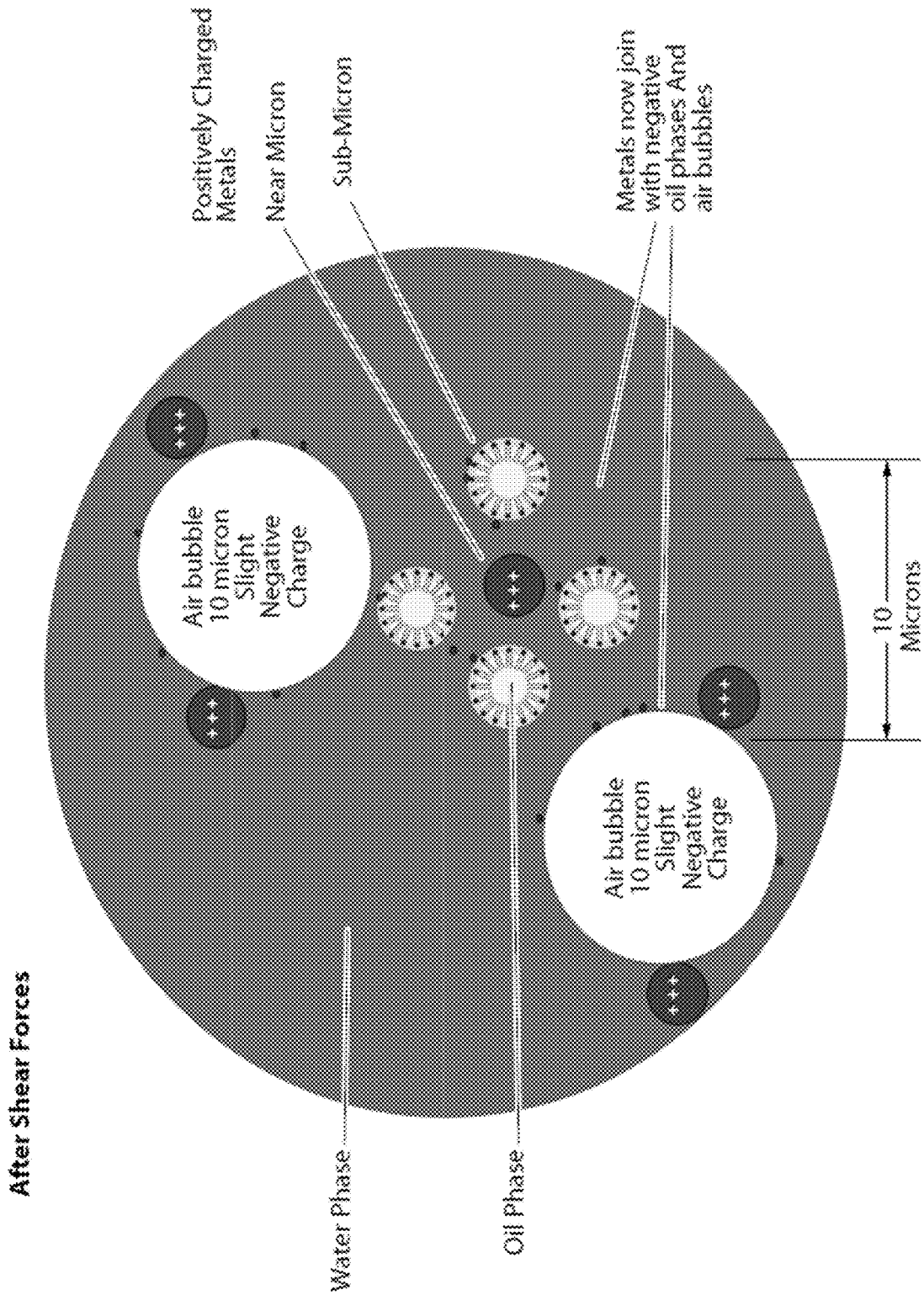

High Hydraulic Shear Force Application

Section "A-A"
Shear Spray Nozzles Adaption

Section "A-A"
Shear Spray Nozzles Adaption

SYSTEMS AND METHODS FOR REMOVING MICRO-PARTICLES FROM A METALWORKING FLUID

CROSS REFERENCE TO RELATED APPLICATIONS

This application is a Continuation of U.S. patent application Ser. No. 17/733,144 filed Apr. 29, 2022, which is hereby incorporated by reference in its entirety.

BACKGROUND OF THE INVENTION

The present invention generally relates to methods and systems for removal of metal particle from a metalworking fluid, and in particular to methods and systems for removal of metal micro-particles from a metalworking fluid comprising an anionic and/or nonionic emulsifier.

Metal forming or metal deformation processes create very small metal particles referred to as micro-fines. These particles are typically from 30 micron to sub-micron (below one micron) in size. When the metalworking fluid is an emulsion (in particular, an oil-in-water emulsion), these sub-micron non-ferrous metal particles cannot be removed by conventional filtration and separation techniques such as pressure media filtration, vacuum assist media filtration, settling separation and centrifugation because these methods will remove the emulsion along with micro-fines associated with the fluid from the deformation process. Since the non-ferrous sub-micron particles have low magnetic permeability, they cannot be removed by magnetic separators. Further complicating some of these deformation processes, such as but not limited to, extrusion deformation, is the fact that there is very little carryout on the deformed part. Therefore, the non-ferrous metallic micro-fines build up in the emulsion lubricant rendering the lubricant saturated with micro-fines after only a few weeks of use. The micro-fine particles contribute to abrasive wear on the die surfaces resulting in poor surface finish on the deformed part and in some cases the emulsion may phase separate. One remedy is to perform a partial release of the emulsion lubricant, thus diluting the metallic particle loading as expressed in milligrams per liter (mg/L), or a complete recharge of the emulsion lubricant, commonly referred to as a DCR, dump clean and recharge. A DCR is a waste of product and a potential stress on the environment.

The use of nominal or absolute rated filter media (under vacuum or pressure) is a common practice but filter media rated below 5 microns can strip out emulsion droplets. Therefore, the filter media cannot be effective in removing submicron particles. Also, there is a desire to have "zero-waste" to landfill. Filter media of any kind saturated with metallic fines and oil is a stress factor on the environment.

To further complicate the particle separation, these micro-fine particles carry a positive charge when they are immediately stripped away from the base metal. For example, metallic copper parts have an effective zero valence expressed as $Cu^0$. However, when these micro-fine particles are stripped away from the base part, they are driven to a free ion form and carry two positive charges and expressed as $Cu^{++}$. Similarly, when aluminum is stripped from its base part in a deformation process as referenced above, the result is aluminum converting from $Al^0$ to $Al^{+++}$. These metals in their ionic form will readily react with any anion in solution and form an electro-kinetic bond. [See FIG. 1]. The higher the anionic charge, the more micro-fine particles will adhere to that anion. In some chemical anionic based emulsions using an oleic acid based emulsion system, the $Cu^{++}$ or $Al^{+++}$ bond form a precipitate or more chemically accurate a metallic soap. The copper and aluminum soaps carry the micro particles and lubricant to the die surfaces as well as the entire metalworking machine surface. The metallic soap residues will interfere with the machine functions as well as accelerate die wear as previously mentioned.

Conventional methods to weaken or destroy this metallic/anion bonds are to use chelating chemicals such as a sodium salt of ethylenediaminetetraacetic acid (EDTA) or nitrilotriacetic acid (NTA). The use of chelating chemicals are not desired since they bind the metal phase in a chemical complex and make metal separation from the chelate in subsequent wastewater treatment processes very challenging.

There is a need for a method and system for removing micro-fine particles from a metalworking fluid.

BRIEF SUMMARY OF THE INVENTION

In one embodiment there is a method of removing metal particles from a contaminated metalworking fluid comprising emulsion droplets and metal particles, the method including pressurizing a first clean metalworking fluid with gas to provide an aerated metalworking fluid; releasing the pressure of the aerated metalworking fluid to form a plurality of bubbles; applying a shear force to the contaminated metalworking fluid to separate the emulsion droplets from the metal particles; flowing the contaminated metalworking fluid with the aerated metalworking fluid in a laminar flow to form a combined fluid, wherein the flowing occurs during the formation of the plurality of bubbles and while the emulsion droplets are separated from the metal particles, and wherein the laminar flow lasts for a time sufficient for the plurality of bubbles to attach to the metal particles; releasing the combined fluid into a flotation tank; and removing the metal particles to form a second clean metalworking fluid.

In some embodiments the contacting occurs within about 0.5 second or less after the releasing of the pressure of the aerated metalworking fluid. In some embodiments the flowing occurs within about 0.5 second or less after applying the shear force. In some embodiments the shear force is a hydraulic shear force, for example applying a hydraulic shear force including injecting the aerated metalworking fluid into a flow of contaminated metal working fluid in a direction perpendicular to the flow of contaminated metal working fluid. In other embodiments the shear force is a mechanically generated shear force. The amount of emulsifier in the second clean metalworking fluid may be within about 0.1 v % to about 15 v % of the amount of emulsifier in the contaminated metalworking fluid. The coagulation channel may be substantially straight.

In another embodiment there is a method for removing metal particles from a contaminated metalworking fluid comprising emulsion droplets and metal particles, the method comprising: pressurizing the contaminated metalworking fluid with gas in a pressurization vessel to provide an aerated metalworking fluid; flowing the aerated metalworking fluid from the bottom of the pressurization vessel to a coagulation channel; applying a shear force to the aerated metalworking fluid to separate the emulsion droplets from the metal particles; reducing the pressure of the aerated metalworking fluid to provide a plurality of bubbles, wherein the reducing the pressure occurs after applying the shear force and while the emulsion droplets are separated from the metal particles; flowing the aerated metalworking fluid in a laminar flow through the coagulation channel to a floatation tank, wherein the laminar flow lasts for a time sufficient for the plurality of bubbles to attach to the metal particles; releasing the aerated metalworking fluid into the flotation tank; and removing the metal particles to provide a clean metalworking fluid. In some embodiments the reducing the pressure is about 0.5 second or less after applying the shear force. In some embodiments the reducing the pressure occurs within 0.5 second after applying the shear force. The shear force may be a mechanically generated shear force. The amount of emulsifier in the clean metalworking fluid may be within about 0.1 v % to about 15 v % of the amount of emulsifier in the contaminated metalworking fluid. The coagulation channel may be substantially straight.

In some embodiments the time sufficient for the plurality of bubbles to attach to the metal particles is at least about 1.0 second. In some embodiments the metal particles have an average particle size of about 30 micron or less. In some embodiments the first clean metalworking fluid or clean metalworking fluid is pressurized with gas at about 3.5 bar to about 6.2 bar for about two minutes or longer. In some embodiments the aerated metalworking fluid and the contaminated metalworking fluid are flowed in a flow ratio in a range of 1:5 (v:v) to 1:1 (v:v). In some embodiments the metal particles are non-ferrous, for example, the metal particles may comprise one or more of copper, aluminum, nickel, lead, titanium, tungsten and molybdenum.

In some embodiments the gas comprises atmospheric air. In some embodiments the gas is selected from nitrogen, oxygen, ozone, and combinations thereof. The gas bubbles may have a size in a range of from about 10 microns to about 50 microns.

In some embodiments the contaminated metalworking fluid comprises an emulsifier. Such emulsifier may be an anionic emulsifier, a nonionic emulsifier, a combination of anionic and nonionic emulsifier, or a cationic emulsifier. In some embodiments including a nonionic emulsifier and an anionic emulsifier, the nonionic emulsifier is present at about 0.1% wt. to 20% wt of the anionic emulsifier. The contaminated metalworking fluid may be an oil-in-water phase emulsion. In some embodiments the emulsifier (or emulsion droplets) may have a size in a range of about 10 microns to 1 micron.

The metalworking process may be a metal forming or metal removal process.

In another embodiment there is a system for removing particles from a contaminated metalworking fluid. Such system may include a pressurization tank; a mechanical shear device; a coagulation channel having a length sufficient to provide a laminar flow of a fluid through the coagulation chamber for at least about 1 second; and a flotation tank. The coagulation channel may be substantially straight.

In another embodiment there is a system for removing particles from a contaminated metalworking fluid. Such system may include a pressurization tank; a hydraulic shear device; a coagulation channel having a length sufficient to provide a laminar flow of a fluid through the coagulation chamber for at least about 1 second; and a flotation tank. The coagulation channel may be substantially straight.

In some embodiments the hydraulic shear device includes an inner pipe; an outer pipe surrounding the inner pipe and approximately coaxial with the inner pipe; a first end cap and a second end cap, each sized to seal an end of the inner pipe; and a rod having a first end and a second end and extending through the inner pipe and the through the first end cap, the second end of the rod being connected to the second end cap. The rod may be capable of pushing the end cap off of the second end of the inner pipe to release a first fluid flowing through the inner pipe in a direction perpendicular to a flow of a second fluid through the outer pipe. The rod may be capable of pulling the end cap on the second end of the inner pipe to seal the flow of fluid out of the inner pipe through the second end.

In some embodiments the hydraulic shear device includes a pipe and a nozzle for injecting a fluid perpendicular to the direction of the pipe.

BRIEF DESCRIPTION OF THE SEVERAL VIEWS OF THE DRAWINGS

The foregoing summary, as well as the following detailed description of embodiments of the methods and systems for separating metal particles from a metalworking fluid, will be better understood when read in conjunction with the appended drawings of an exemplary embodiment. It should be understood, however, that the invention is not limited to the precise arrangements and instrumentalities shown.

In the drawings:

FIG. 4 is a drawing of slightly negatively charged air bubbles associated with flocculated metal particle and emulsion droplets;

FIG. 5 is a drawing of emulsion droplets separated from metal particles after application of shear force to a contaminated metalworking fluid;

DETAILED DESCRIPTION OF THE INVENTION

Figure 1:
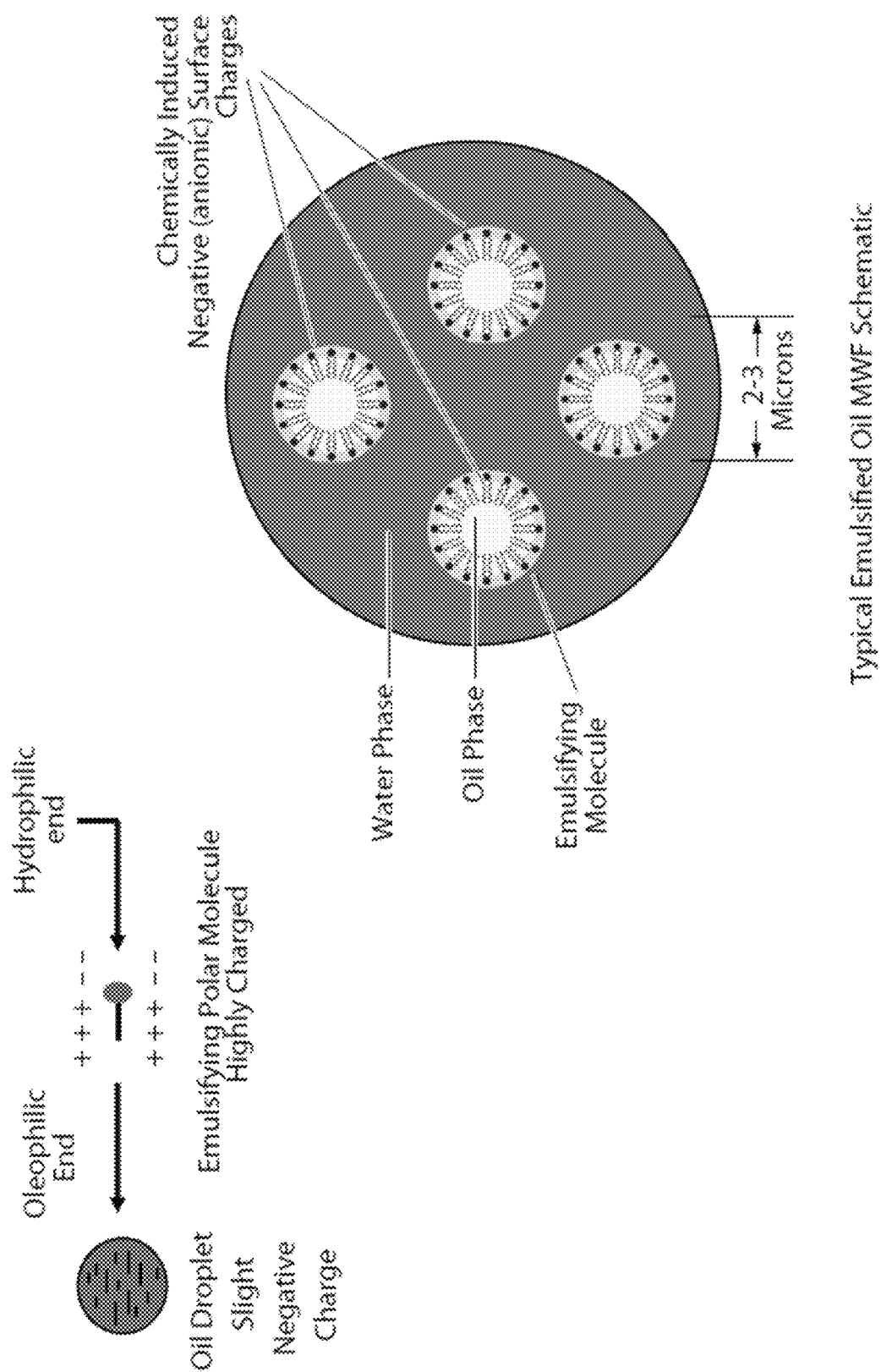
FIG. 1 is a drawing of a typical emulsified oil-in-water metalworking fluid comprising a water phase and oil droplets surrounded or substantially surrounded by emulsifier molecules.

Various embodiments are described which provide systems and methods of removing metal particles from a metalworking fluid, in particular for removing metal particles having an average size of about 30 microns or less from a metalworking fluid comprising an emulsion, such as an oil-in-water emulsion comprising an anionic and/or nonionic emulsifier.

The methods and systems of the present invention provide several advantages over the prior art. The present invention is capable of removing particles (e.g., metal particles) having an size or average size of about 30 microns to about 10 microns or even smaller from solution. The present invention is capable of removing such particles without substantially affecting the emulsion composition, that is without removing emulsifier droplets from the metalworking fluid. The bond (e.g., electro-kinetic bond) of the particle (e.g., metal ion) to the emulsifier (e.g., anionic chemical) is expected to be stable, but the gas bubble as it comes out of solution preferentially separates the particle from the emulsifier without damaging or removing the emulsion droplet or other fluid components. The inventors have discovered that preferential separation can be achieved through application of a shear force to the emulsion-particle flocculant, contacting the fluid comprising the separated emulsion droplets and particles with a fluid comprising a dissolved gas for a time sufficient for gas bubbles to form and attach to the particles, and maintaining the contact of the fluids in a laminar or quiescent flow to avoid the emulsion droplets displacing the gas bubbles and recombining with the particles. Prior art teaches a gentle application of contaminated metalworking solution; shearing the contaminated metalworking fluid is opposite of common practice. The removal of some portion of metal particles from the metalworking fluid allows for an improved stability of the metalworking fluid emulsion by allowing the emulsifiers to better react as anions and not a metal-anion complex, which forms when metal particles contaminate the metalworking fluid. The addition of a nonionic surfactant along with anionic surfactants at a ratio of about 0.1% wt. to 20% wt. (nonionic/anionic) as the total weight of the emulsifier package is anticipated to improve the efficiency of the micro particle separation (also used along with high shear force enhancement).

Methods

Various embodiments are described which provide methods of removing metal particles from a metalworking fluid. For example, the removal process typically uses dissolved air flotation (DAF) plus shear forces followed by laminar flow fluid alignment and quiescent flotation to separate metal particles from the emulsion droplets.

The metalworking fluid may be a fluid used in any metalworking process, such as a metal deformation process. Metal removal deformation includes but is not limited to one or more of the following operations: machining deformation, impact deformation, pressure deformation, and extrusion deformation. Machining deformation processes include, but are not limited to: drilling, boring, reaming, tapping, thread rolling, thread chasing, hobbing, milling, turning, sawing, planning, scraping, shearing, shaving, broaching, cutting, grinding, polishing, burnishing, and vibratory deburring. Impact deformation processes include, but are not limited to: stamping, cold forging, warm forging, and hot forging. Pressure deformation processes include, but are not limited to: hydroforming, sintering, hot rolling, and cold rolling. Extrusion deformation processes include, but are not limited to: wire and rod forming through a die or series of dies. bar to rod rolling, rod to strip rolling, rod to wire drawing (intermediate wire), and rod to wire drawing (fine wire). Such metalworking processes can result in metal particles contaminating the metalworking fluid.

Methods of the present invention can be used to remove metal particles contaminating a metalworking fluid after a metalworking process. Such metal particles may have an average particle size of about 50 micron or less, about 40 micron or less, about 30 micron or less, about 20 micron or less, or about 10 micron or less. In some embodiments such metal particles may have an average particle size of about 1 micron to about 50 microns, about 1 micron to about 40 microns, about 1 micron to about 30 microns, about 1 micron to about 25 microns, about 1 micron to about 20 microns, about 1 micron to about 10 microns, about 0.1 micron to about 10 micron, about 0.1 micron to about 20 micron, about 0.1 micron to about 30 micron.

The metal worked (e.g., deformed) and accordingly, the metal particle contaminants typically comprise non-ferrous metals or non-ferrous alloys, that is, the predominant alloy is not iron. In some embodiments the metal worked (e.g., deformed) and accordingly, the metal particle contaminants comprise or consist essentially of copper, aluminum, nickel, lead, titanium, tungsten, intermetallics such as molybdenum, or a combination thereof.

In general, such metalworking fluid comprises an emulsifier, forming an emulsion. Typically, the emulsion is an oil-in-water emulsion, although a water-in-oil emulsion is also contemplated. The emulsion may comprise anionic surfactants, dispersants and/or emulsifiers used individually or in combination. The emulsion may comprise nonionic surfactants, dispersants and/or emulsifiers used individually or in combination. In some embodiments the emulsion may comprise a combination of anionic and nonionic surfactants, dispersants, and/or emulsifiers used individually or in combination. For example, in some embodiments the emulsion comprises a nonionic emulsifier and an anionic emulsifier, wherein the nonionic emulsifier is present at about 0.1 wt % to about 20 wt %, about 0.5 wt % to about 15 wt %, about 1 wt % to about 10 wt %, about 10 wt % to about 20 wt %, or about 0.1 to about 5 wt % of the anionic emulsifier. In still other embodiments the metalworking fluid may be based on a cationic surfactant, dispersant, and/or emulsifier.

Examples of typical emulsifiers are described in U.S. Pat. No. 6,818,809 and U.S. Patent Publication No. 20160326017, each of which is hereby incorporated by reference in its entirety.

Anionic emulsifiers include, but are not limited to, fatty carboxylic acids; and phosphated, mixed blend of C12-C14 and C12-C15 ethoxylated alcohols. Nonlimiting examples of suitable anionic emulsifiers include sodium dodecylbenzene sulfonate, sodium dodecyl sulphate (SDS), sodium stearate, N-ethoxy sulfonate, alcohol propoxy sulphate (APS), alpha-olefin sulfonate (AOS), alkyl polyalkoxy alkyl sulfonate, alkyl aryl polyalkoxy alkyl sulfonate, branched alkyl benzene sulfonate, docusate sodium, guerbet alkoxy sulphate, sulfonated, ethoxylated alcohol or alkyl phenol, and alkyl alcohol propoxylated sulphate.

In some embodiments the emulsifier is a nonionic emulsifier. Nonionic emulsifiers include, but are not limited to, fatty alcohol ethoxylates, castor-oil based ethoxylates, fatty acid ethoxylates, ethylene oxide-propylene oxide (EO-PO) block copolymers (poloxamers), sorbitan(ol) ester ethoxylates, lanolin alcohol ethoxylates, polyol esters, and lanolin alcohols. Nonlimiting examples of nonionic emulsifiers include polyhydric alcohol, nonyl phenol, polyoxyethylene alcohol, alkylphenol ethoxylate, NEODOL™, NEODOL™ ethoxylate 91-8, NEODOL™ 67 propoxylated sulphate (N67-7POS), and SYNPERONIC™ PE/F68.

In some embodiments the metalworking fluid comprises a lubricant. Lubricants may include, but are not limited to, petroleum oil, synthetic oils such as polyalphaolefin (PAO) or phosphate ester, natural esters, synthetic esters, soaps (sodium or potassium), waxes, and boron compounds. In some embodiments the metalworking fluid comprises one or more other additives, such as stain inhibitors, corrosion inhibitors, anti-microbial compounds, anti-oxidants, alkanolamines, and phosphate EP additives.

In some embodiments the metalworking fluid is thermally stable in a range of about 70° F. to about 250° F. In some embodiments the metalworking fluid is preferred to be bio-stable, that is, will not readily grow bacteria or fungus when maintained at concentrations above 4% by volume.

Without being bound by theory, it is believed that application of shear force immediately before or during formation of air bubbles allows for separation of micro-fine metal particles from the metalworking fluid and emulsion droplets. Referring to FIG. 1, a typical emulsified oil-in-water metalworking fluid comprises a water phase and oil droplets surrounded or substantially surrounded by emulsifier molecules. The oil molecule may have a negative charge and the emulsifier molecule may have an oleophilic end that is positively charged and a hydrophilic end that is negatively charged. The emulsifier molecules arrange around the oil droplet to provide emulsion droplets having a negatively charged surface. The emulsion droplet size may be in the range of about 1 micron to about 25 micron, about 1 micron to about 20 micron, about 1 micron to about 15 micron, about 1 micron to about 10 micron, or about 1 micron to about 5 micron. In some embodiments the emulsion droplet is at least 1 micron.

Figure 2:
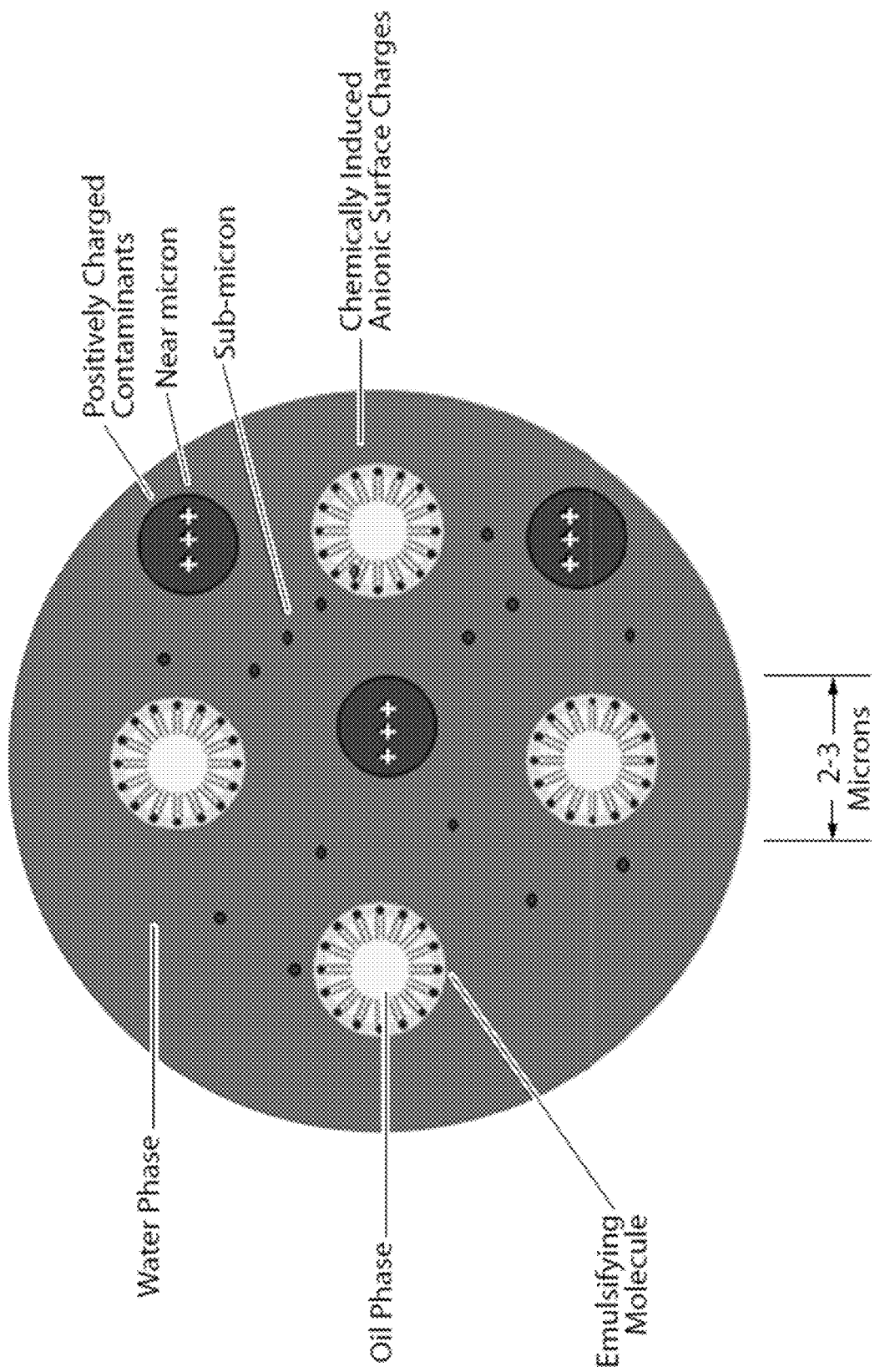
FIG. 2 is a drawing of a typical contaminated metalworking fluid including positively charged metal particles.
Figure 3:
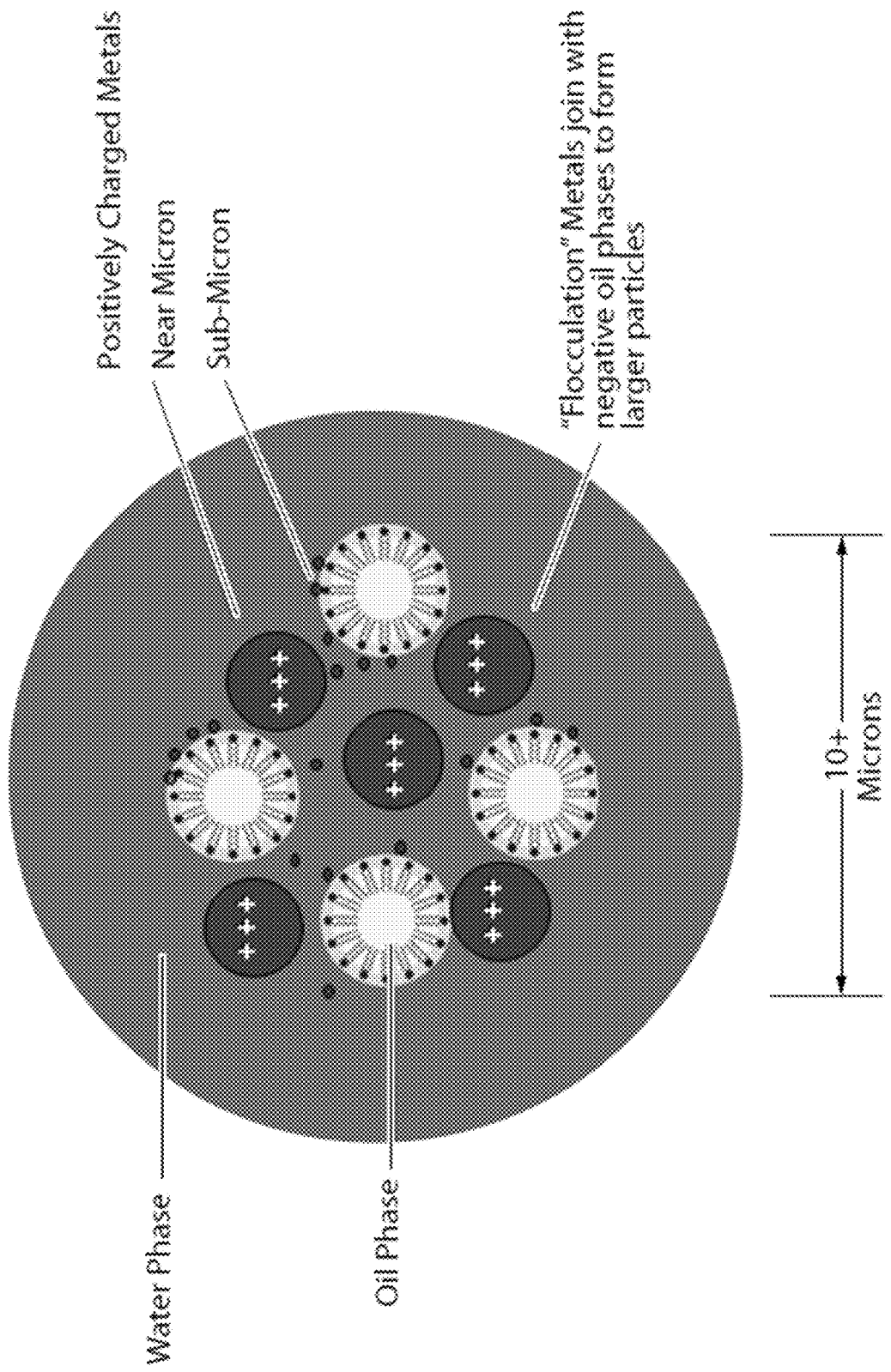
FIG. 3 is a drawing of flocculated positively charged metal particles and negatively charged emulsion droplets.

Still without being bound by theory, referring to FIG. 2, it is believed that contaminated metalworking fluid may have positively charged metal particles that are of near micron and/or sub-micron particle sizes. Referring to FIG. 3, it is believed that the positively charged metal particles and the negatively charged emulsion droplets may flocculate, that is join together to form larger particles. Referring to FIG. 4, it is believed that air bubbles produced have a slightly negative charge and may associate with the flocculated metal particle and emulsion droplets. Referring to FIG. 5, it is believed that application of a shear force causes disruption of the flocculated metal particle and emulsion droplets, and separation of the emulsion droplets from the metal particles. Formation of air bubbles during or immediately after application of the shear force allows for the air bubbles to attach to the positively charged metal particles exclusive of emulsion droplets. Put another way, the shear forces briefly dislodge the metal ions from the emulsion surface (e.g., positively charged metal ions from the anionic emulsion surface) and are exchanged, in part, with the dissolved gas (e.g., air) coming out of solution as bubbles (e.g., micro bubbles). For example, the slightly negatively charged micro-bubbles may capture the positive metal micro-particles by electro-kinetic attraction and form together during a laminar flow or a quiescent flow.

In some embodiments, a method of removing metal particles from a contaminated metalworking fluid includes pressurizing a clean metalworking fluid with gas to provide an aerated metalworking fluid. A clean metalworking fluid may refer to a fresh, unused metalworking fluid, or a metalworking fluid that has been recycled or cleaned of contaminants, such as metal particles. The clean metalworking fluid may be pressurized with gas at a pressure and for a duration sufficient to provide gas bubbles of about 10 micrometers when the pressure is released. The clean metalworking fluid may be pressurized with gas at about 3 bar to about 7 bar, about 3.5 bar to about 6.5 bar, about 3.5 bar to about 6.2 bar, or about 4 bar to about 6 bar for about 2 minutes to about 10 minutes or longer, about 2 minutes to about 5 minutes or longer, about 2 minutes or longer, about 3 minutes or longer, or about 4 minutes or longer. In some embodiments the clean metalworking fluid may be pressurized with gas at about 3.5 bar to about 6.2 bar for about 2 minutes or longer.

The clean metalworking fluid may be pressurized with any suitable gas including but not limited to gases comprising nitrogen, oxygen, ozone, or mixtures thereof. In some embodiments the gas may be atmospheric air, such as a mixture of gases including about 75% by weight to about 85% by weight nitrogen and about 15% by weight to about 25% by weight oxygen.

In some embodiments, the method of removing metal particles from a contaminated metalworking fluid further includes releasing the pressure of the aerated metalworking fluid to form a plurality of gas bubbles. Releasing the pressure may comprise reducing the pressure to about 2.5 bar to about 0.5 bar, about 1.5 bar to about 0.5 bar, or about 1 bar. Releasing the pressure may comprise allowing the pressure of the aerated metalworking fluid to return to atmospheric pressure. In some embodiments the bubbles formed have an average size in a range of from about 10 microns to about 50 microns, about 10 microns to about 40 microns, about 10 microns to about 30 microns, or about 10 microns to about 20 microns.

In some embodiments, a method of removing metal particles from a contaminated metalworking fluid may further include applying a shear force to the contaminated metalworking fluid to separate the emulsion droplets from the metal particles. In some embodiments the shear force applied is a hydraulic shear force. The applying a hydraulic shear force may include injecting the aerated metalworking fluid into a flow of contaminated metalworking fluid in a direction approximately perpendicular to the flow of contaminated metalworking fluid, for example about 75° to about 105°, about 80° to about 100°, about 85° to about 95°, or about 90° relative to the flow of the contaminated metalworking fluid. In some embodiments the aerated metalworking fluid may be injected from the center of the flow of the contaminated metalworking fluid and outward perpendicular into the contaminated metalworking fluid, as for example, shown in FIGS. 6A-6B. In other embodiments the aerated metalworking fluid may be injected from the periphery of the flow of the contaminated metalworking fluid and inward toward the center of the flow of the metalworking fluid, as for example, shown in FIGS. 7A-7D. In such embodiments, the aerated metalworking fluid may be injected via one or more nozzles, and preferably one or more pairs of nozzles, wherein each nozzle in a pair of nozzles is oriented opposite and towards each other. In some embodiments a nozzle provides back pressure between about 50 and about 90 PSIG.

Figure 9A:
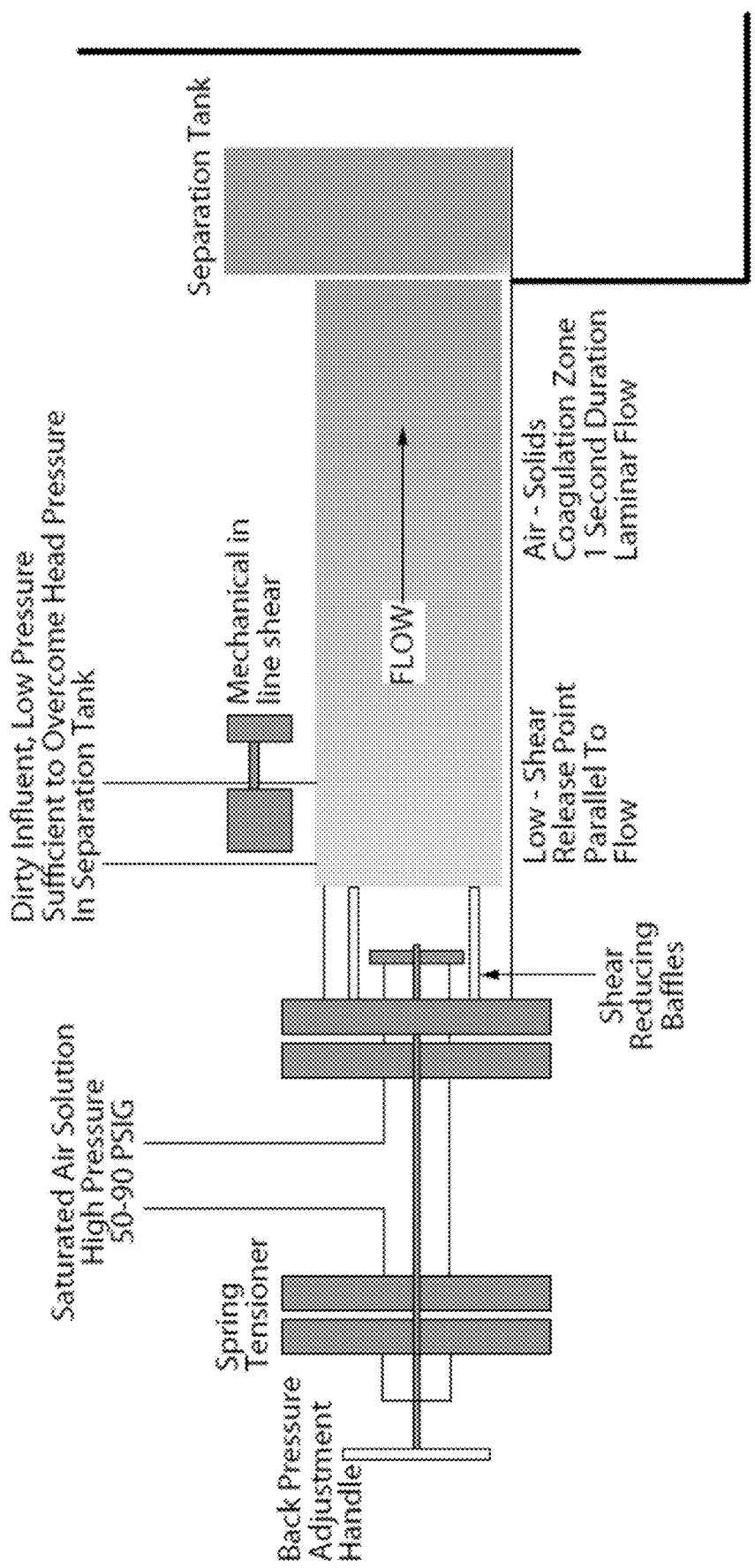
FIG. 9A is a side view of a system for removing particles from a contaminated metalworking fluid in accordance with an exemplary embodiment of the present invention.
Figure 9B:
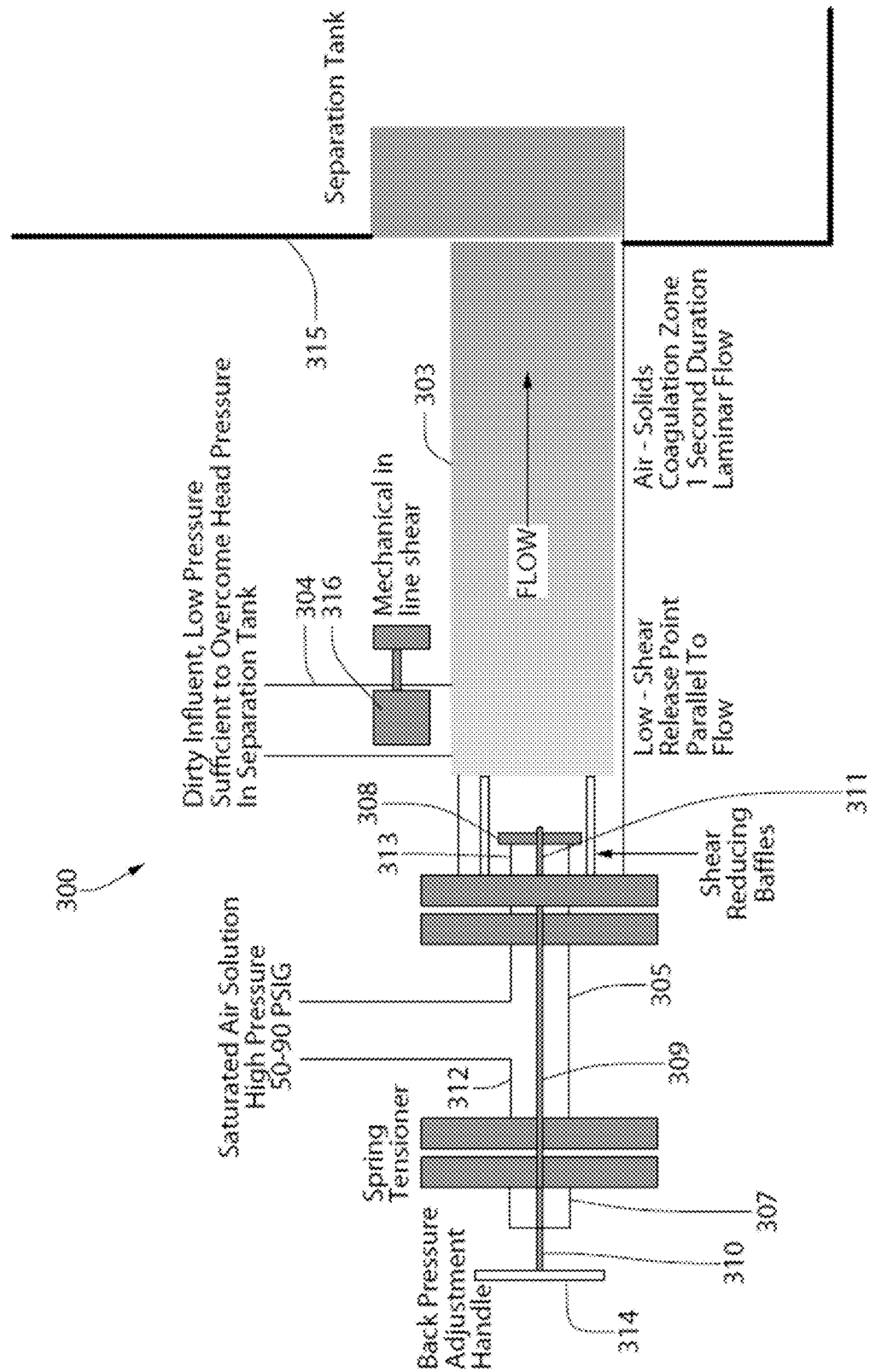
FIG. 9B is a side view identical to FIG. 9A wherein the system components are numerically labeled.

In some embodiments the shear force applied is a mechanically generated shear force, for example as shown in FIGS. 9A-9B. It is preferable that the formation of the gas bubbles occurs at a location immediately after the point that the high shear forces are applied to the contaminated metalworking fluid so that the metal particles dislodged from the emulsion droplet by the shear forces have an opportunity to combine with the released gas bubbles rather than back to the surface of emulsion droplets. In some embodiments hydraulic shear application of the aerated metalworking fluid can be used in series with mechanical shear equipment. Hydraulic and mechanical methods of shear generating forces are described above, but this is not limited to any particular shear generating device.

In some embodiments, a method of removing metal particles from a contaminated metalworking fluid may further include flowing the contaminated metalworking fluid with the aerated metalworking fluid in a laminar flow to form a combined fluid. In some embodiments the flowing occurs during the formation of the plurality of bubbles and while the emulsion droplets are separated from the metal particles.

In some embodiments the aerated metalworking fluid and the contaminated metalworking fluid are flowed in a flow ratio in a range of about 1:5 v:v to about 1:1 v:v, for example about 1:3 v:v.

In some embodiments the flowing the contaminated metalworking fluid with the aerated metalworking fluid occurs within about 1 second, about 0.9 second, about 0.8 second, about 0.7 second, about 0.6 second, about 0.5 second, about 0.4 second, about 0.3 second, about 0.2 second, about 0.1 second or less after the releasing of the pressure of the aerated metalworking fluid. In some embodiments the flowing occurs within about 1 second, about 0.9 second, about 0.8 second, about 0.7 second, about 0.6 second, about 0.5 second, about 0.4 second, about 0.3 second, about 0.2 second, about 0.1 second or less after the applying the shear force. In some embodiments the flowing occurs at or about the same time as the releasing of the pressure of the aerated metalworking fluid. In some embodiments the flowing occurs at or about the same time as the applying a shear force. In some embodiments the applying a shear force occurs at the same time as the releasing of the pressure of the aerated metalworking fluid.

In some embodiments the laminar flow lasts for a time sufficient for the plurality of bubbles to attach to the metal particles. In some embodiments the laminar flow lasts for about 0.3 second or longer, about 0.4 second or longer, about 0.5 second or longer, about 0.6 second or longer, about 0.7 second or longer, about 0.8 second or longer, about 0.9 second or longer, or about 1 second or longer. In some embodiments the laminar flow lasts for about 0.5 second to about 10 seconds, about 0.5 second to about 8 seconds, about 0.5 second to about 5 seconds, about 1 second to about 5 seconds, about 1 second to about 3 seconds, or about 0.5 second to about 1.5 second.

In some embodiments the laminar flow is through a coagulation channel. The length of the coagulation channel is preferably long enough to allow for at least about one second of laminar flow. In preferred embodiments, the coagulation channel is substantially straight to allow for laminar flow with minimal turbulence.

In some embodiments, a method of removing metal particles from a contaminated metalworking fluid may further include releasing the combined fluid into a flotation tank and removing the metal particles to form a second clean metalworking fluid. For example, removing the metal particles can be by skimming, scooping, or other methods known by persons of skill in the art.

In some embodiments the amount of emulsifier in the second clean metalworking fluid is within about 0.1% v/v to about 15% v/v, about 0.1% v/v to about 10% v/v, about 0.1% v/v to about 5% v/v, about 0.1% v/v to about 1% v/v of the amount of emulsifier in the contaminated metalworking fluid. In some embodiments the amount of emulsifier in the second clean metalworking fluid is about 0.1% v/v to about 15% v/v, about 0.1% v/v to about 10% v/v, about 0.1% v/v to about 5% v/v, about 0.1% v/v to about 1% v/v less than the amount of emulsifier in the contaminated metalworking fluid.

Figure 11A:
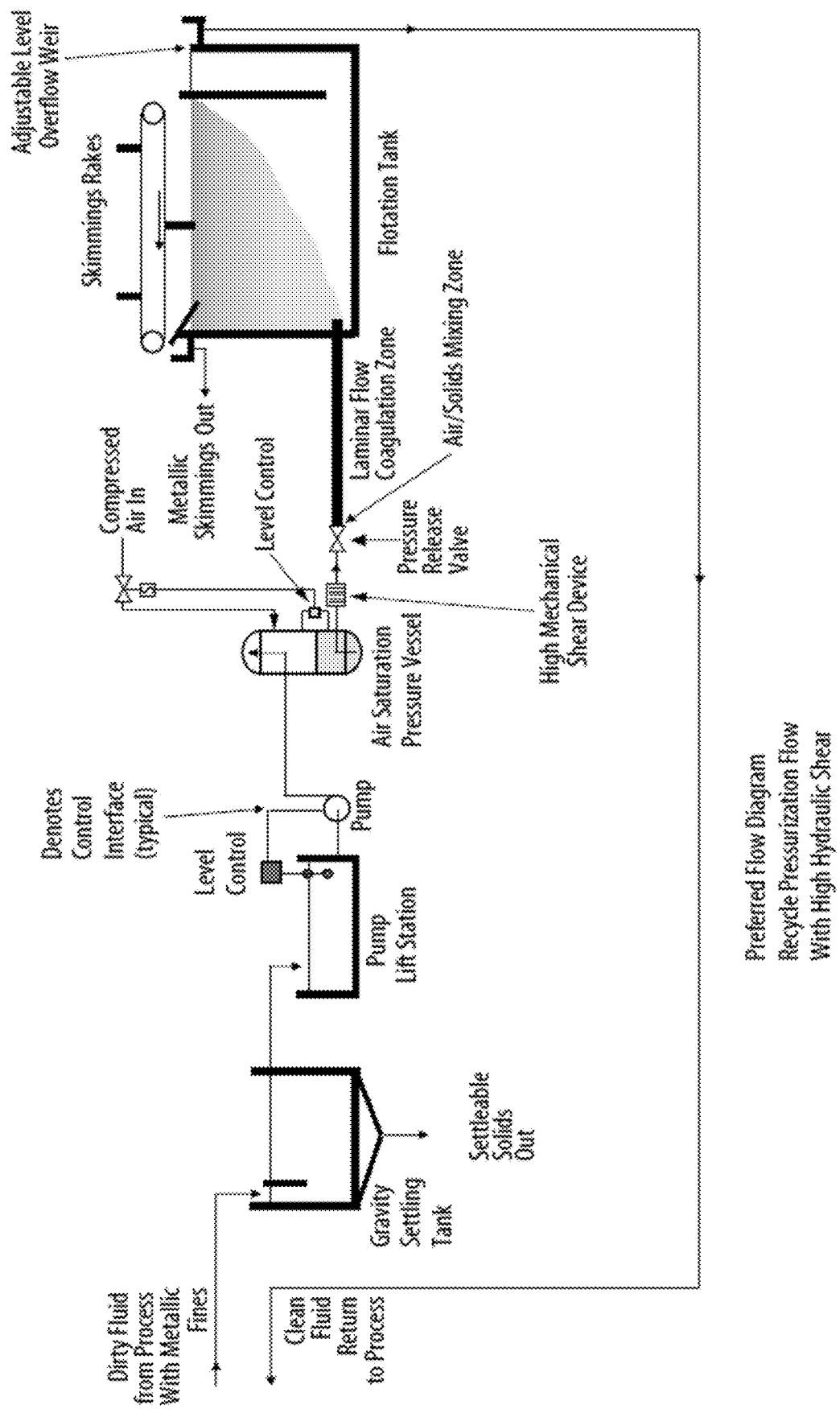
FIG. 11A is a side view of a system for removing particles from a contaminated metalworking fluid in accordance with an exemplary embodiment of the present invention.
Figure 11B:
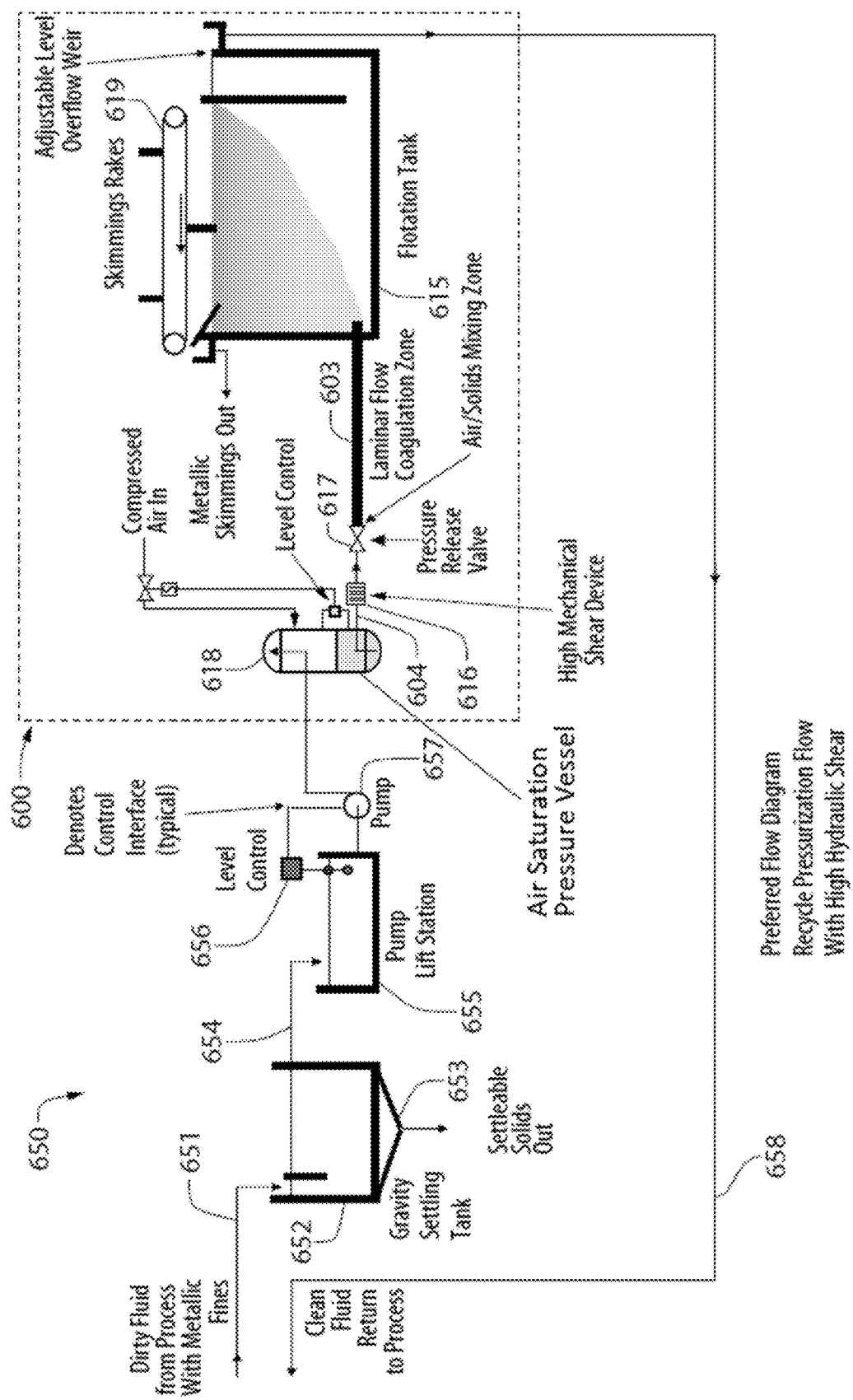
FIG. 11B is a side view identical to FIG. 11A wherein the system components are numerically labeled.

In another embodiment, a method for removing metal particles from a contaminated metalworking fluid includes pressurizing the contaminated metalworking fluid with gas in a pressurization vessel to provide an aerated metalworking fluid, for example as shown in FIGS. 11A-11B. The contaminated metalworking fluid may be pressurized with gas at a pressure and for a duration sufficient to provide gas bubbles of about 10 micrometers when the pressure is released. The contaminated metalworking fluid may be pressurized with gas at about 3 bar to about 7 bar, about 3.5 bar to about 6.5 bar, about 3.5 bar to about 6.2 bar, or about 4 bar to about 6 bar for about 30 seconds to about 10 minutes or longer, about 1 minute to about 5 minutes or longer, about 2 minutes to about 5 minutes or longer, about 1 minute or longer, about 1.5 minutes or longer, about 2 minutes or longer, or about 3 minutes or longer. In some embodiments the contaminated metalworking fluid may be pressurized with gas at about 3.5 bar to about 6.2 bar for about 2 minutes or longer. Gases that may be use include but are not limited to gases comprising nitrogen, oxygen, ozone, or mixtures thereof. In some embodiments the gas may be atmospheric air, such as a mixture of gases including about 75% to 85% nitrogen and about 15%-25% oxygen.

In some embodiments, a method of removing metal particles from a contaminated metalworking fluid may further include flowing the aerated metalworking fluid from the bottom of the pressurization vessel to a coagulation channel. The bottom of the pressurization vessel refers to the bottom half, bottom one-third, or bottom one-fourth of the pressurization vessel or to the bottom half, bottom one-third, or bottom one-fourth of the aerated metalworking fluid in the pressurization vessel.

In some embodiments, a method of removing metal particles from a contaminated metalworking fluid may further include applying a shear force to the aerated metalworking fluid to separate the emulsion droplets from the metal particles. For example, the shear force may be a mechanically generated shear force.

In some embodiments the method further includes reducing the pressure of the aerated metalworking fluid to provide a plurality of bubbles, wherein the reducing the pressure occurs after applying the shear force and while the emulsion droplets are separated from the metal particles. Releasing the pressure may comprise reducing the pressure to about 2.5 bar to about 0.5 bar, about 1.5 bar to about 0.5 bar, or about 1 bar. Releasing the pressure may comprise allowing the pressure of the aerated metalworking fluid to return to atmospheric pressure. In some embodiments the reducing the pressure occurs within about 1 second, about 0.9 second, about 0.8 second, about 0.7 second, about 0.6 second, about 0.5 second, about 0.4 second, about 0.3 second, about 0.2 second, about 0.1 second or less after the applying the shear force. In some embodiments the bubbles have an average size in a range of from about 10 microns to about 50 microns, about 10 microns to about 40 microns, about 10 microns to about 30 microns, or about 10 microns to about 20 microns.

In some embodiments the method further includes flowing the aerated metalworking fluid in a laminar flow through the coagulation channel to a flotation tank.

In some embodiments the laminar flow lasts for a time sufficient for the plurality of bubbles to attach to the metal particles. In some embodiments the laminar flow lasts for about 0.3 second or longer, about 0.4 second or longer, about 0.5 second or longer, about 0.6 second or longer, about 0.7 second or longer, about 0.8 second or longer, about 0.9 second or longer, or about 1 second or longer. In some embodiments the laminar flow lasts for about 0.5 second to about 10 seconds, about 0.5 second to about 8 seconds, about 0.5 second to about 5 seconds, about 1 second to about 5 seconds, about 1 second to about 3 seconds, or about 0.5 second to about 1.5 second.

In some embodiments the length of the coagulation channel is preferably long enough to allow for at least about one second of laminar flow. In preferred embodiments, the coagulation channel is substantially straight to allow for laminar flow with minimal turbulence.

In some embodiments the method further includes releasing the aerated metalworking fluid into the flotation tank; and removing the metal particles to provide a clean metalworking fluid.

In some embodiments the amount of emulsifier in the clean metalworking fluid is within about 0.1 v % to about 15 v %, about 0.1 v % to about 10 v %, about 0.1 v % to about 5 v %, about 0.1 v % to about 1 v % of the amount of emulsifier in the contaminated metalworking fluid. In some embodiments the amount of emulsifier in the clean metalworking fluid is about 0.1 v % to about 15 v %, about 0.1 v % to about 10 v %, about 0.1 v % to about 5 v %, about 0.1 v % to about 1 v % less than the amount of emulsifier in the contaminated metalworking fluid.

In some embodiments a method for removing metal particulates from a metalworking fluid described above comprises a phase in a multi-phase purification process. In some embodiments a multi-phase purification process comprises separating large particles, e.g., those greater than about 10 microns, by conventional means such as, basic settling, filtration (gravity, vacuum assist, or pressure assist), hydrocyclones, centrifugation.

The embodiments described above for removing microparticles from a metalworking solution can be included as part of a multistage purification process, for example as shown in FIGS. 8A-8B, 10A-10B, and 11A-11B. In some embodiments, a multistage purification method comprises flowing contaminated metalworking fluid from a metalworking (e.g., deformation) process into a basic gravity settling tank where the metal particles readily drop out of the continuous solution because of a significant difference of specific gravity of the metallic particle versus the metalworking fluid. The solution overflows to a pump lift station where the contaminated metalworking fluid is injected into a clean (e.g., recycled) fluid and sheared and flowed together, for example as depicted in FIGS. 6A-6B or FIGS. 7A-7D. The now air and metal particle complex will rise in the flotation tank, where they will be skimmed off, e.g., by skimming rakes. The cleaned fluid moves downward through the flotation tank and may be directed to the pump circuit for the recycle pressurization piping loop or may be returned to the metalworking process.

Figure 10A:
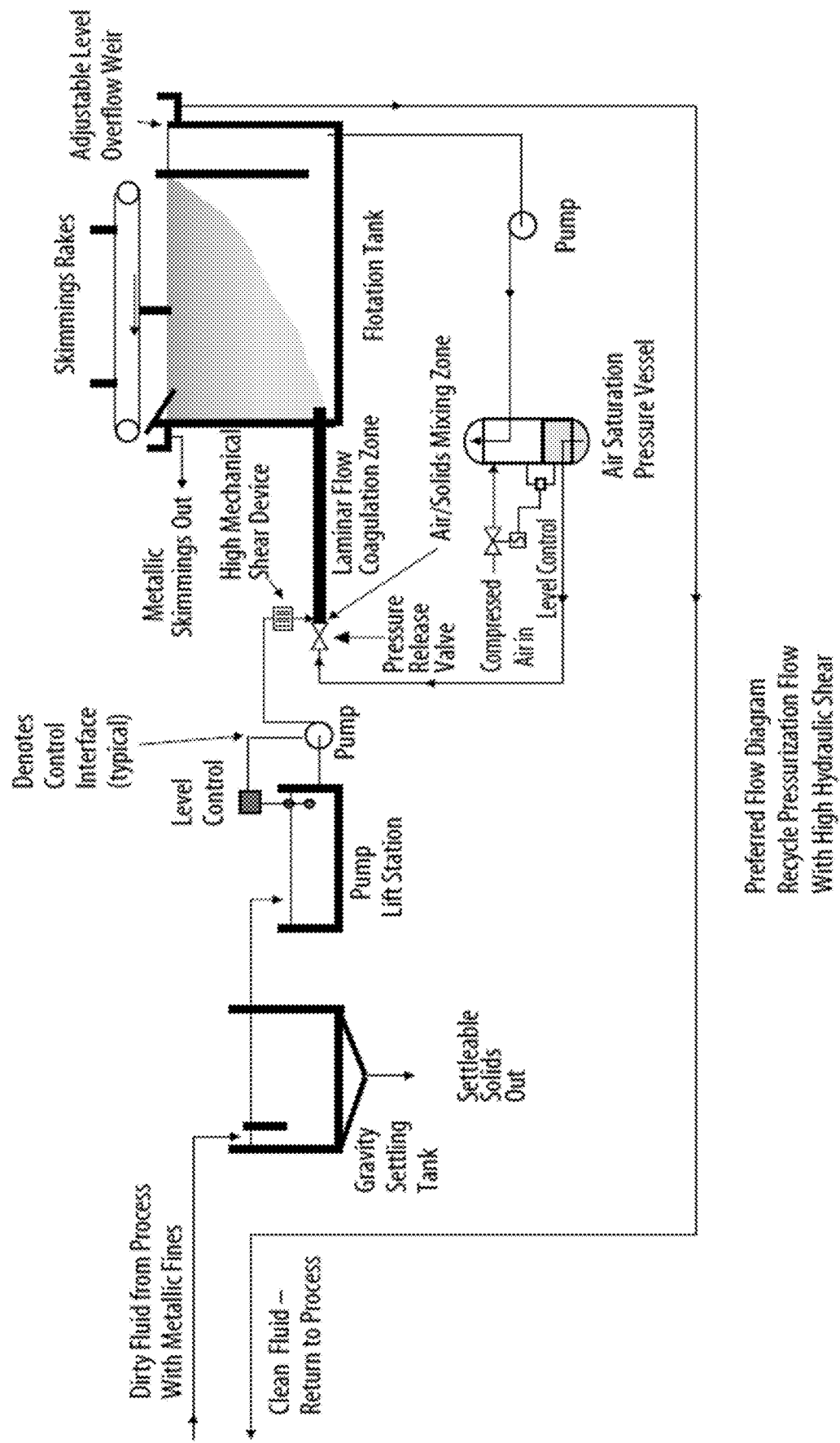
FIG. 10A is a side view of a system for removing particles from a contaminated metalworking fluid in accordance with an exemplary embodiment of the present invention.
Figure 10B:
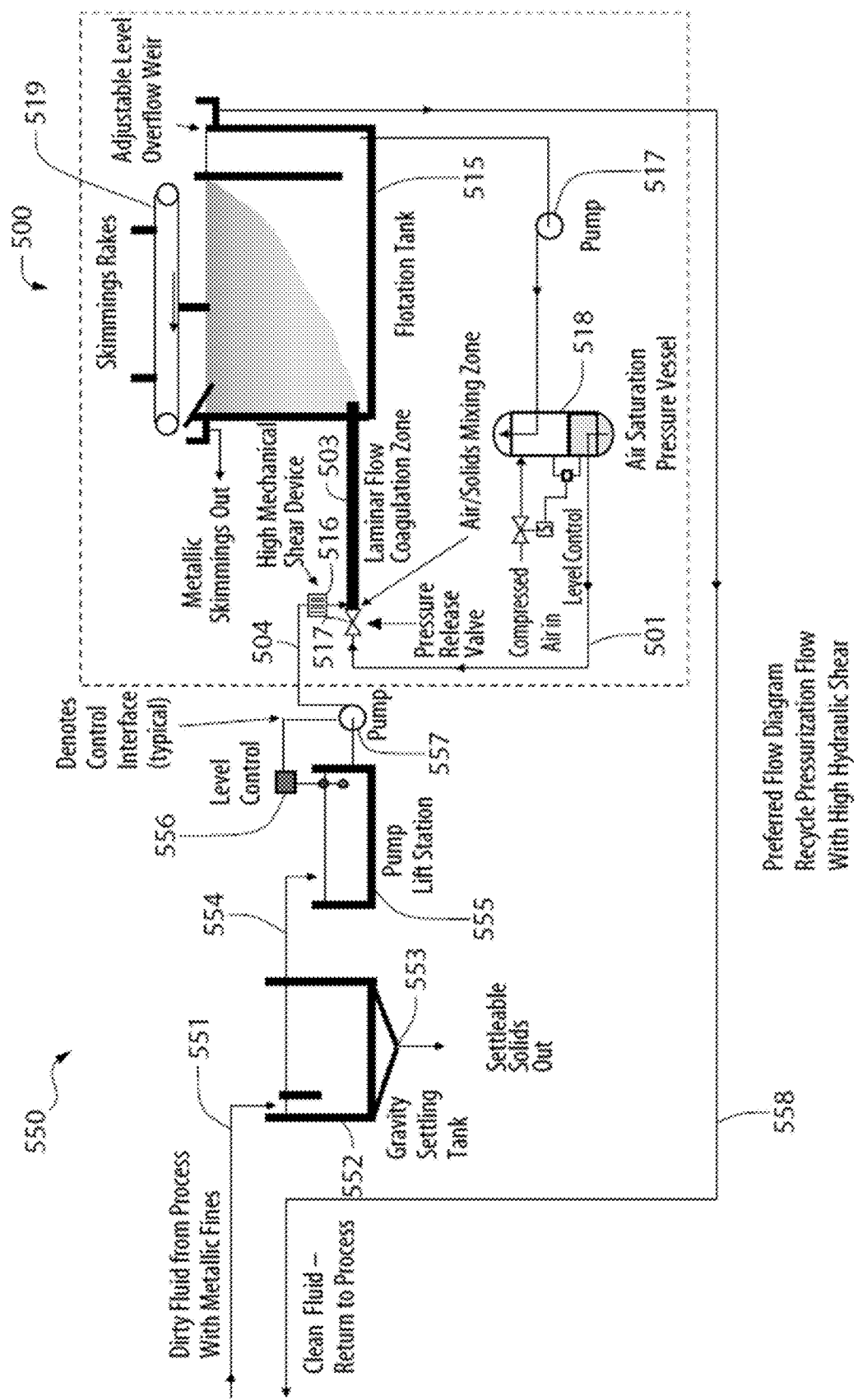
FIG. 10B is a side view identical to FIG. 10A wherein the system components are numerically labeled.

In another embodiment of a multistage purification process, for example as shown in FIGS. 10A-10B, contaminated metalworking fluid from the deformation process enters a basic gravity settling tank where the metal particles readily drop out of the continuous solution because of a significant difference of specific gravity of the metallic particle versus the metalworking fluid. The solution overflows to a pump lift station where a mechanically generated shear is applied to the contaminated metalworking fluid as depicted in FIGS. 9A-9B. As described above, the shear forces dislodge the positively charged metal ions from the emulsion surface and are exchanged, in part, with the dissolved gas coming out of solution as micro bubbles. Without being bound by theory, it is believed that the slight negative charge micro bubbles capture the positive metal micro-particles by electro-kinetic attraction and form together within the coagulation channel. The now air and metal particle complex will rise in the flotation tank, where they will be skimmed off by the skimming rakes. The cleaned fluid will move downward through the flotation tank. In some embodiments the clean metalworking fluid may be directed to the pump circuit for the recycle pressurization piping loop or may be returned for use in the metalworking process, as shown in FIGS. 10A-10B. In other embodiments the clean metalworking fluid may be returned for use in the metalworking process only, or the pressurization loop may be eliminated, as shown in FIGS. 11A-11B.

Systems

Figure 6A:
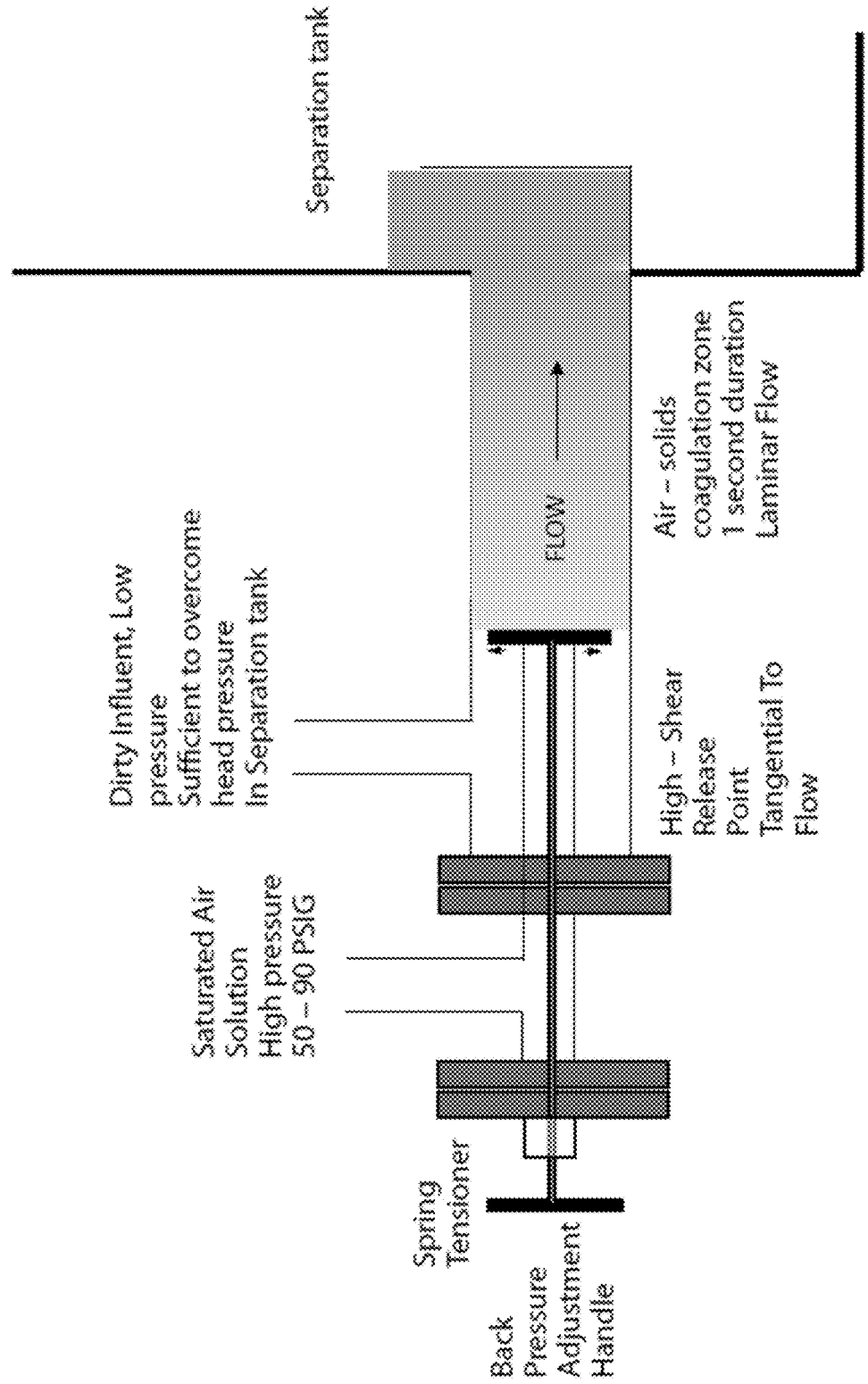
FIG. 6A is a side view of a system for removing particles from a contaminated metalworking fluid in accordance with an exemplary embodiment of the present invention.
Figure 6B:
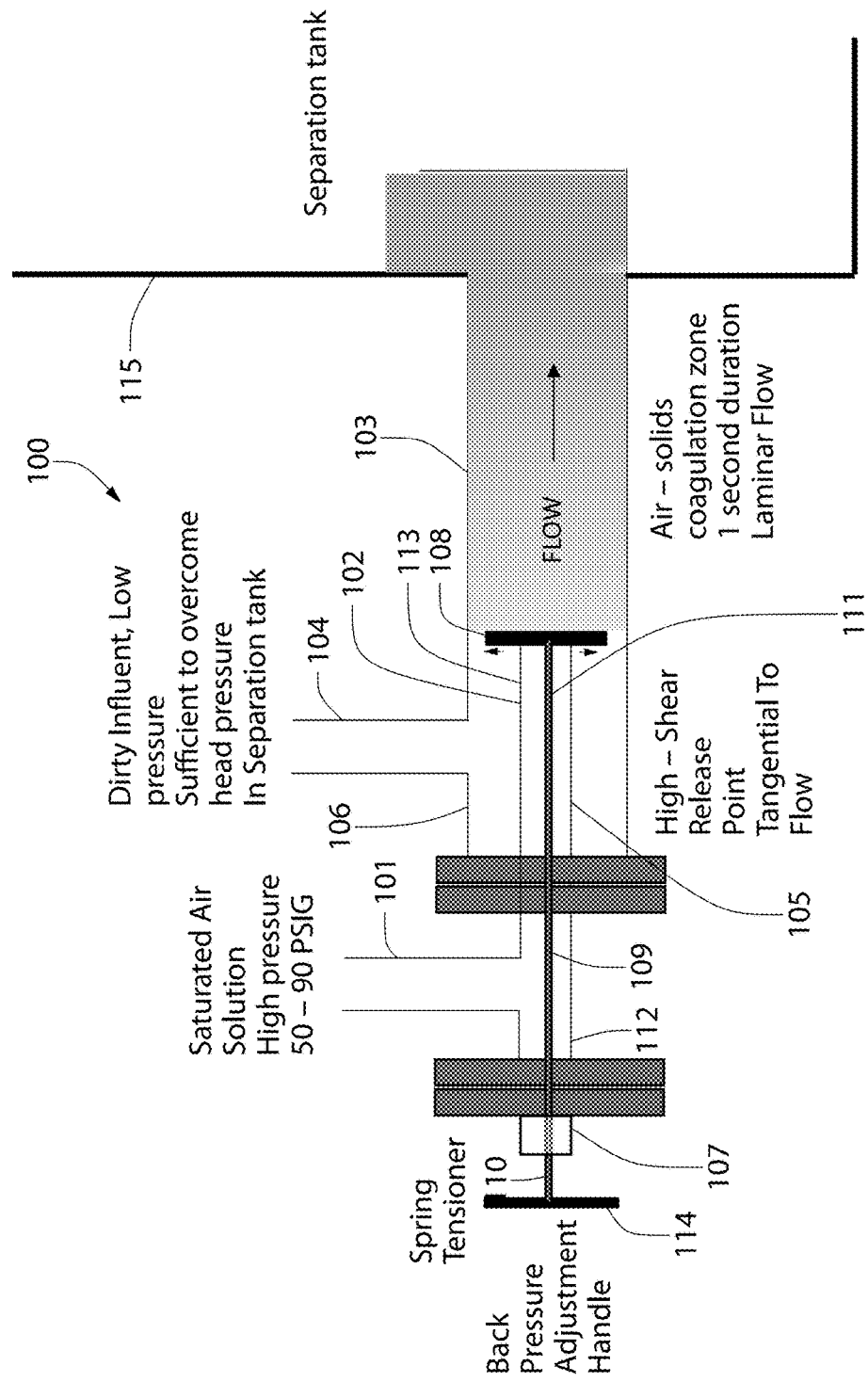
FIG. 6B a side view identical to 6A wherein the system components are numerically labeled.

Methods of the present invention are particularly useful in conjunction with the systems described herein. Referring to the drawings in detail, wherein like reference numerals indicate like elements throughout, there is shown in FIG. 6B a system for removing particles from a contaminated metalworking fluid, generally designated (100), in accordance with an exemplary embodiment of the present invention. A pressurization tank (not shown) for pressurizing a clean metalworking fluid with a gas is in fluid connection via conduit (101) with a hydraulic shear device (102). The hydraulic shear device (102) is in fluid connection with a conduit (104) for contaminated metalworking fluid. Conduit (104) is in fluid connection with coagulation channel (103). The hydraulic shear device (102) releases an aerated, pressurized fluid substantially perpendicular to the flow of the contaminated metalworking fluid into coagulation channel (103). Hydraulic shear device (102) comprises inner pipe (105) and outer pipe (106). Inner pipe (105) has a first end (112) and a second end (113). Outer pipe (106) surrounds inner pipe (105) and is approximately coaxial with inner pipe (105). First end cap (107) is sized to seal the first end (112) of the inner pipe (105) and second end cap (108) is sized to seal the second end (113) of the inner pipe (105). Rod (109) has a first end (110) which extends through first end cap (107) and attaches to a pressure adjustment handle (114) and a second end (111) which attaches to second end cap (108). Rod (109) extends through the inner pipe (105) and is capable of pushing the second end cap (108) off of the second end (113) of the inner pipe (105) to release a first fluid (e.g., an aerated fluid) flowing through the inner pipe (105) in a direction perpendicular to a flow of a second fluid (e.g., a contaminated metalworking fluid) through the outer pipe (106), thereby creating shear. Rod (109) is also capable of pulling the second end cap (108) on the second end (113) of the inner pipe (105) to seal the flow of fluid out of the inner pipe (105) through the second end (113). The movement of rod (109) can be controlled by the pressure adjustment handle (114).

Still referring to FIG. 6B, the contaminated metalworking fluid and the aerated fluid are contacted through the hydraulic shear and are flowed through the coagulation chamber (103). In some embodiments the coagulation channel may have a length sufficient to provide a laminar flow of a fluid through the coagulation chamber for at least about 1 second. Coagulation channel (103) is preferably substantially straight, as shown in FIG. 6B. The coagulation channel (103) is in fluid connection with flotation tank (115). A plurality of gas bubbles is released in the coagulation chamber and cause the metal particles to float towards the top of the fluid in the flotation chamber (104). The metal particles begin to be separated in the flotation chamber (104). An identical system without reference numerals is shown in FIG. 6A.

Figure 7A:
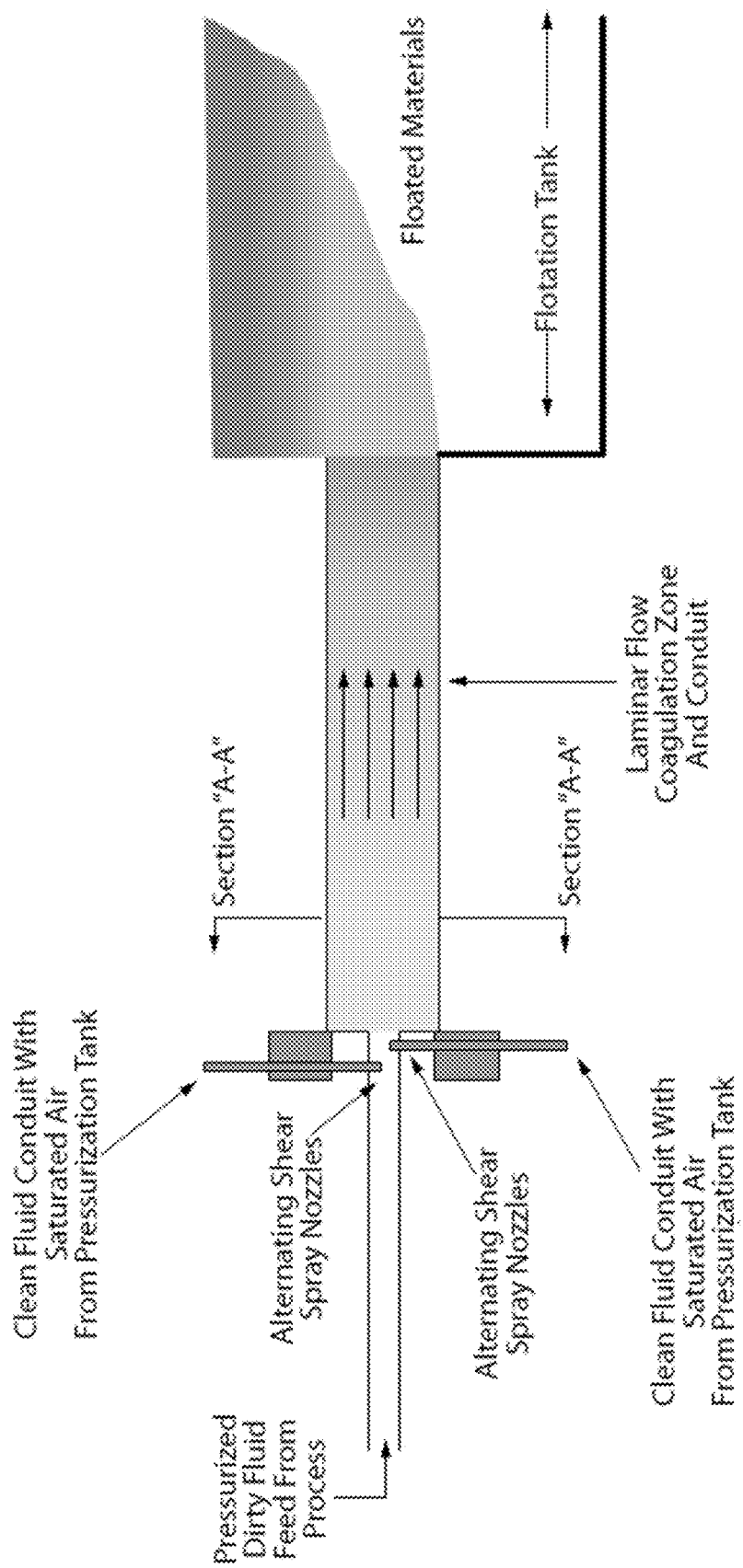
FIG. 7A is a side view of a system for removing particles from a contaminated metalworking fluid in accordance with an exemplary embodiment of the present invention.
Figure 7B:
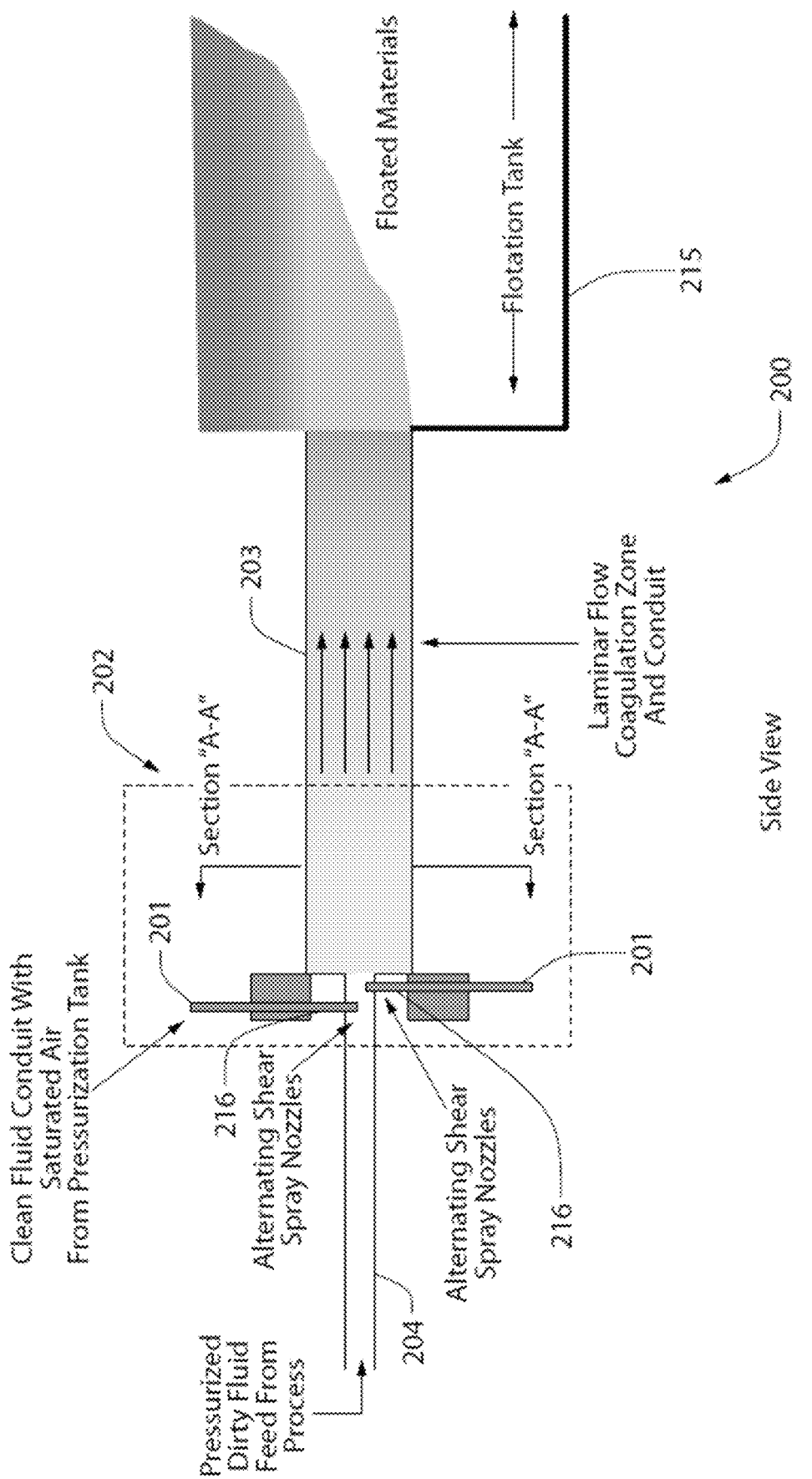
FIG. 7B is a side view identical to 7A wherein the system components are numerically labeled.
Figure 7C:
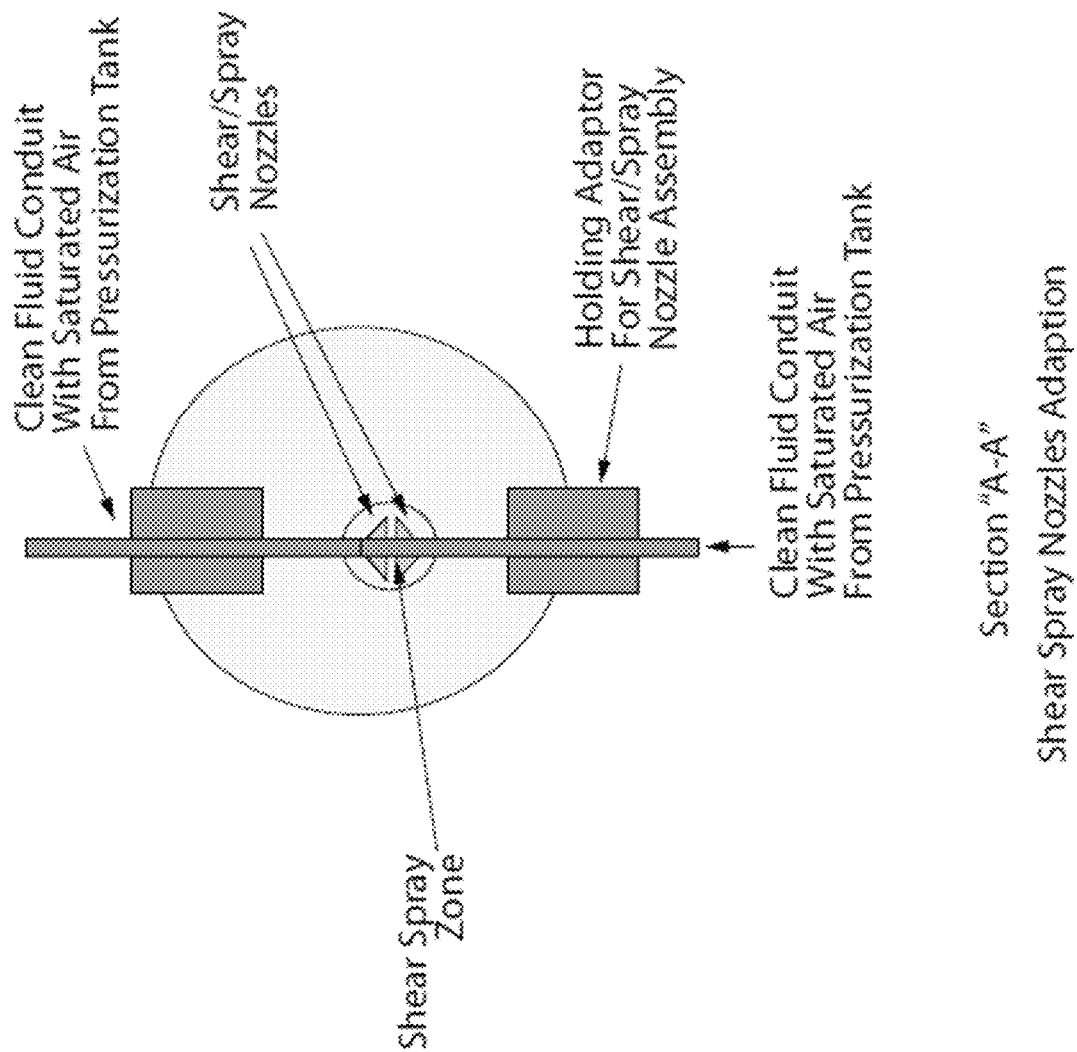
FIG. 7C is a cut-away view of the hydraulic shear device of the system for removing particles from a contaminated metalworking fluid shown in FIGS. 7A-7B.
Figure 7D:
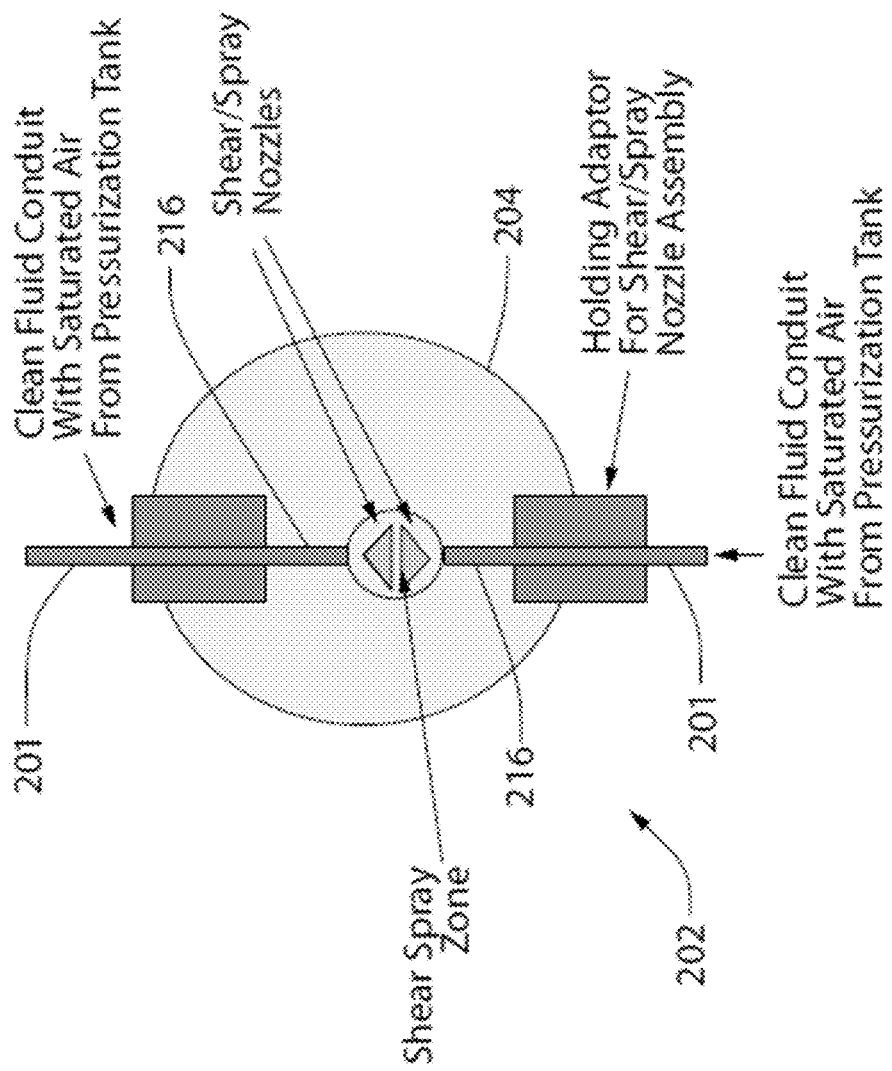
FIG. 7D is a cut-away view identical to FIG. 7C wherein the system components are numerically labeled.

Referring now to FIGS. 7B and 7D, there is shown a second embodiment of a system for removing particles from a contaminated metalworking fluid, generally designated (200). The second embodiment is similar to the first embodiment of the system for removing particles from a contaminated metalworking fluid except that the pressurized fluid is injected perpendicular to the flow of the contaminated fluid from the outside of the flow of the contaminated fluid toward the center, thereby creating shear, rather than from the center of the flow of the contaminated fluid.

A pressurization tank (not pictured) for pressurizing a clean metalworking fluid with a gas is in fluid connection via conduit (201) with a hydraulic shear device (202). The hydraulic shear device (202) is in fluid connection with a conduit (204) for contaminated metalworking fluid. Conduit (204) is in fluid connection with coagulation channel (203). The hydraulic shear device (202) releases an aerated, pressurized fluid substantially perpendicular to the flow of the contaminated metalworking fluid into coagulation channel (203). Hydraulic shear device (202) comprises nozzle (216) for injecting fluid perpendicular to the direction of coagulation channel (203) and the flow of the contaminated metalworking fluid. Two nozzles (216) are shown in FIG. 11B, but any suitable number of nozzles can be used. In some embodiments, nozzles (216) are arranged approximately equidistant around the circumference of the coagulation channel (203). In some embodiments, the nozzles are positioned in such a manner to alternate their application of the shear forces by a finite distance positioned in the direction of flow/shear and aimed opposite of each other. Although two spray nozzles are shown in FIGS. 7B and 7D, there can be more nozzles as deemed suitable for this application, preferably if they are in pairs and alternate each other by a finite distance.

Still referring to FIGS. 7B and 7D, the contaminated metalworking fluid and the aerated fluid are contacted through the hydraulic shear and are flowed through the coagulation chamber (203). In some embodiments the coagulation channel may have a length sufficient to provide a laminar flow of a fluid through the coagulation chamber for at least about 1 second. Coagulation channel (203) is preferably substantially straight, as shown in FIGS. 7B and 7D. The coagulation channel (203) is in fluid connection with flotation tank (215). A plurality of gas bubbles is released in the coagulation chamber and cause the metal particles to float towards the top of the fluid in the flotation chamber (204). The metal particles can be removed in the flotation tank (215). An identical system to FIG. 7B without reference numerals is shown in FIG. 7A. An identical system to FIG. 7D without reference numerals is shown in FIG. 7C.

Figure 8A:
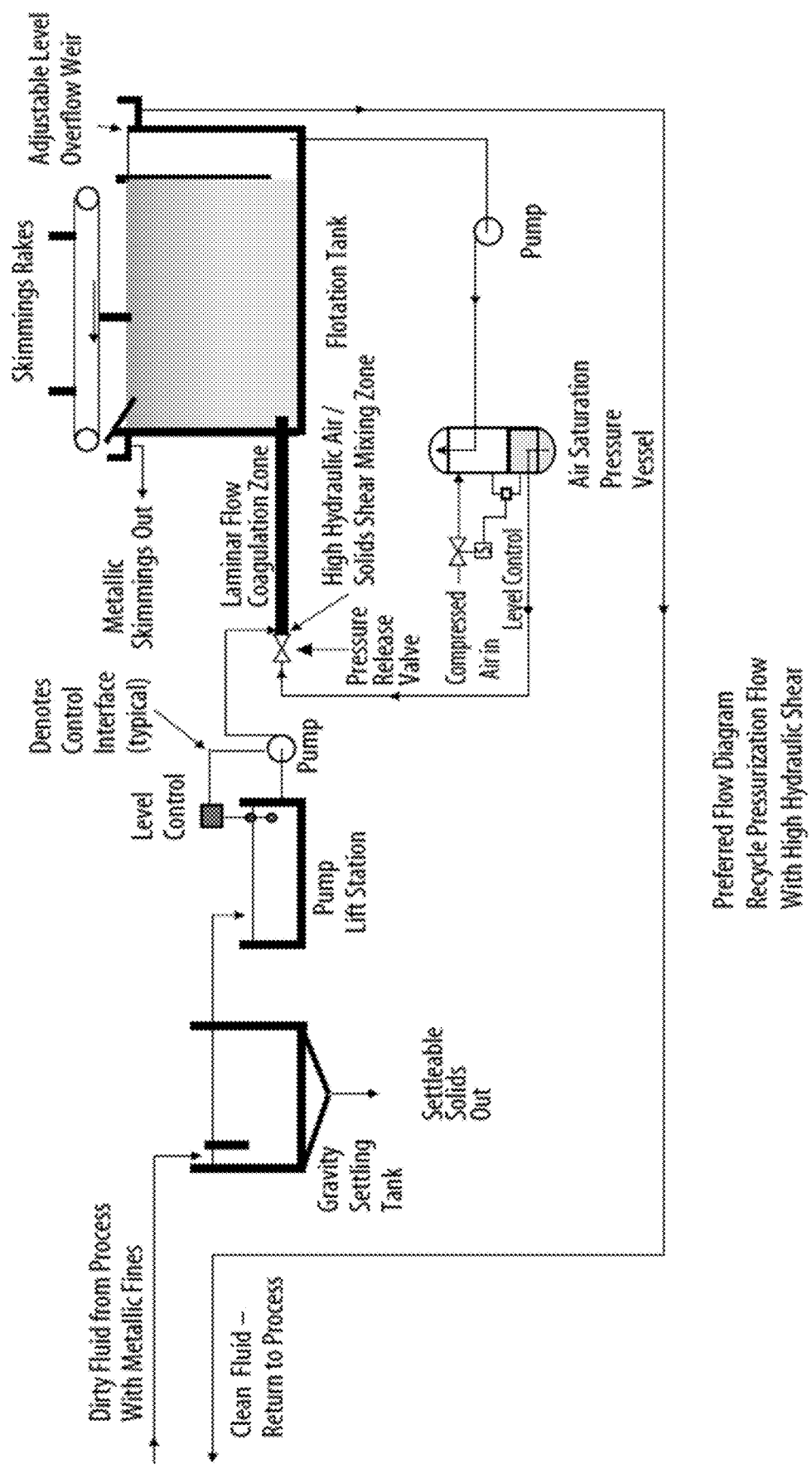
FIG. 8A is a side view of a system for removing particles from a contaminated metalworking fluid in accordance with an exemplary embodiment of the present invention.
Figure 8B:
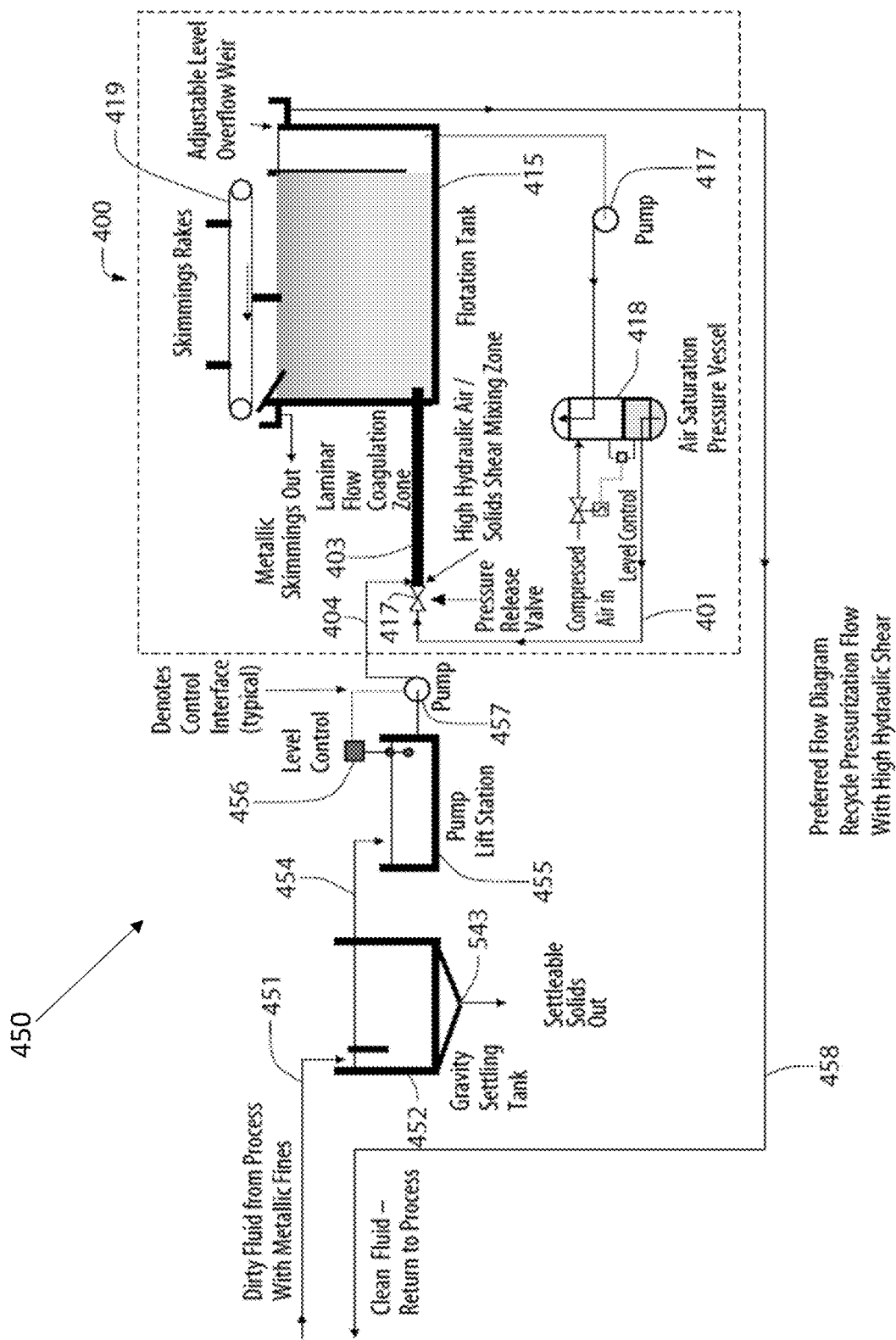
FIG. 8B is a side view identical to 8A wherein the system components are numerically labeled.

Referring now to FIG. 8B, an embodiment of a multistage particle removal system (450) is shown. The multistage particle removal system (450) includes a conduit (451) for contaminated fluid, such as fluid that has been used in a metalworking process. Conduit (451) is in fluid connection with gravity settling tank (452) which has a sealable opening (453) where large and/or dense particles can be removed after settling in the gravity settling tank (452) due to gravity. Gravity settling tank (452) is in fluid connection with pump lift station (455) via conduit (454). Pump lift station (455) includes a level control (456) which is in electrical connection with pump (457). Pump lift station (455) is in fluid connection with pump (457) and contaminated metalworking fluid can be flowed from the gravity settling tank (452) to the pump lift station (453) and pumped by pump (455) via conduit (404) to the laminar coagulation zone (403) of system (400) for removing particles from a contaminated metalworking fluid. System (400) may in some embodiments be a system utilizing hydraulic shear to separate emulsion droplets from metal particles in the contaminated metalworking fluid, such as the systems shown in FIGS. 6 and 7. System (400) includes a pump (417) for sending clean metalworking fluid from flotation tank (415) to an air saturation pressure vessel (also referred to as a pressurization vessel) (418). The clean metalworking fluid is pressurized with a gas, such as (but not limited to) atmospheric air, in the air saturation pressure vessel (418). The pressurization vessel (418) is in fluid connection with a conduit (401) for directing the pressurized or aerated metalworking fluid to the coagulation zone (403). Coagulation channel (403) is preferably substantially straight, as shown in FIG. 8B. System (400) includes a pressure release valve (417) for releasing the pressure in the aerated metalworking fluid and allowing gas bubbles to form. Such pressure release valve (417) may be arranged to provide a hydraulic shear as the aerated metalworking fluid is combined with the contaminated metalworking fluid, for example, as shown in FIGS. 6A-6B and 7A-7D. Coagulation zone (403) is in fluid connection with flotation tank (415) where metal particles can be removed from the fluid, such as by skimming rakes (419). Clean metal working fluid can be flowed from flotation tank (415) to the pressurization vessel (418) or via conduit (458) to be used in a metalworking process. An identical system without reference numerals is shown in FIG. 8A.

Referring now to FIG. 9B, there is shown a third embodiment of a system for removing particles from a contaminated metalworking fluid, generally designated (300). The third embodiment is similar to the first embodiment of the system for removing particles from a contaminated metalworking fluid except instead of a hydraulic shear device, the third embodiment includes a mechanical shear device (316) for separating emulsion droplets from metal particles.

A pressurization tank (301) for pressurizing a clean metalworking fluid with a gas is in fluid connection with an inner pipe (305). Inner pipe (305) has a first end (312) and a second end (313). The second end (313) of inner pipe (305) extends into a coagulation chamber (303). A first end cap (307) is sized to seal the first end (312) of the inner pipe (305) and second end cap (308) is sized to seal the second end (313) of the inner pipe (305). Rod (309) has a first end (310) which extends through first end cap (307) and attaches to a pressure adjustment handle (314) and a second end (311) which attaches to second end cap (308). Rod (309) extends through the inner pipe (305) and is capable of pushing the second end cap (308) off of the second end (313) of the inner pipe (305) to release a first fluid (e.g., an aerated fluid) flowing through the inner pipe (305) into coagulation chamber (303). Rod (309) is also capable of pulling the second end cap (308) on the second end (313) of the inner pipe (305) to seal the flow of fluid out of the inner pipe (305) through the second end (313). The movement of rod (309) can be controlled by the pressure adjustment handle (314).

Still referring to FIG. 9B, a contaminated metalworking fluid flows through conduit (304) to mechanical shear device (316) which applies shear to separate emulsion droplets from metal particles in the metalworking fluid. Conduit (304) is in fluid connection with coagulation chamber (303) to allow contaminated metalworking fluid to flow through conduit (304), through mechanical shear device (316) and into coagulation channel (303). The aerated fluid released out of the second end (313) of the inner pipe (305) and the contaminated fluid released from the conduit (304) are flowed together in a laminar flow through the coagulation chamber (303). In some embodiments the coagulation channel may have a length sufficient to provide a laminar flow of a fluid through the coagulation channel for at least about 1 second. As shown in FIG. 9B, coagulation channel (303) is preferably substantially straight. The coagulation channel (303) is in fluid connection with flotation tank (315). A plurality of gas bubbles is released in the coagulation chamber and cause the metal particles to float towards the top of the fluid in the flotation tank (315). The metal particles can be removed in the flotation tank (315). An identical system without reference numerals is shown in FIG. 9A.

Referring now to FIG. 10B, an embodiment of a multi-stage particle removal system (550) is shown. The multi-stage particle removal system (550) includes a conduit (551) for contaminated fluid, such as fluid that has been used in a metalworking process. Conduit (551) is in fluid connection with gravity settling tank (552) which has a sealable opening (553) where large and/or dense particles can be removed after settling in the gravity settling tank (552) due to gravity. Gravity settling tank (552) is in fluid connection with pump lift station (555) via conduit (554). Pump lift station (555) includes a level control (556) which is in electrical connection with pump (557). Pump lift station (555) is in fluid connection with pump (557) and contaminated metalworking fluid can be flowed from the gravity settling tank (552) to the pump lift station (553) and pumped by pump (555) via conduit (504) to the laminar coagulation zone (503) of system (500) for removing particles from a contaminated metalworking fluid. System (500) may in some embodiments be a system utilizing mechanically generated shear to separate emulsion droplets from metal particles in the contaminated metalworking fluid, such as the system shown in FIGS. 9A-9B. System (500) includes a pump (517) for sending clean metalworking fluid from flotation tank (515) to an air saturation pressure vessel (also referred to as a pressurization vessel) (518). The clean metalworking fluid is pressurized with a gas, such as (but not limited to) atmospheric air, in the air saturation pressure vessel (518). The pressurization vessel (518) is in fluid connection with a conduit (501) for directing the pressurized or aerated metalworking fluid to the coagulation zone (503). Coagulation channel (503) is preferably substantially straight, as shown in FIG. 10B. System (500) includes a pressure release valve (517) for releasing the pressure in the aerated metalworking fluid and allowing gas bubbles to form. Coagulation zone (503) is in fluid connection with flotation tank (515) where metal particles can be removed from the fluid, such as by skimming rakes (519). Clean metal working fluid can be flowed from flotation tank (515) to the pressurization vessel (518) or via conduit (558) to be used in a metalworking process. An identical system without reference numerals is shown in FIG. 10A.

FIG. 11B shows a system similar to FIGS. 10A-10B, except that the clean metal working fluid is flowed only from flotation tank (615) to be used in a metalworking process. In FIG. 11B, a multistage particle removal system (650) includes a conduit (651) for contaminated fluid, such as fluid that has been used in a metalworking process. Conduit (651) is in fluid connection with gravity settling tank (652) which has a sealable opening (653) where large and/or dense particles can be removed after settling in the gravity settling tank (652) due to gravity. Gravity settling tank (652) is in fluid connection with pump lift station (655) via conduit (654). Pump lift station (655) includes a level control (656) which is in electrical connection with pump (657). Pump lift station (655) is in fluid connection with pump (657) and contaminated metalworking fluid can be flowed from the gravity settling tank (652) to the pump lift station (653) and pumped by pump (655) to an air saturation pressure vessel (also referred to as a pressurization vessel) (618). The contaminated metalworking fluid is pressurized with a gas, such as (but not limited to) atmospheric air, in the air saturation pressure vessel (618). The pressurization vessel (618) is in fluid connection with a conduit (604) for directing the pressurized or aerated metalworking fluid to the coagulation channel (603). Coagulation channel (603) is preferably substantially straight, as shown in FIG. 11B. System (600) includes a mechanical shear device (616) to induce a shear force to separate emulsion droplets from metal particles in the contaminated metalworking fluid and pressure release valve (617) for releasing the pressure in the aerated metalworking fluid and allowing gas bubbles to form. The pressure valve (617) is located immediately after the mechanical shear device (616) so that the emulsion droplets are still separated from the metal particles when the gas bubbles formed and the metal particles are free to associate with the gas bubbles in the coagulation zone (603). Coagulation zone (603) is in fluid connection with flotation tank (615) where metal particles can be removed from the fluid, such as by skimming rakes (619). Clean metal working fluid can be flowed from flotation tank (615) via conduit (658) to be used in a metalworking process. An identical system without reference numerals is shown in FIG. 11A.

The following clauses describe certain embodiments.

Clause 1. A method of removing metal particles from a contaminated metalworking fluid comprising emulsion droplets and metal particles, the method comprising:
pressurizing a first clean metalworking fluid with gas to provide an aerated metalworking fluid;
releasing the pressure of the aerated metalworking fluid to form a plurality of bubbles;
applying a shear force to the contaminated metalworking fluid to separate the emulsion droplets from the metal particles;
flowing the contaminated metalworking fluid with the aerated metalworking fluid in a laminar flow to form a combined fluid, wherein the flowing occurs during the formation of the plurality of bubbles and while the emulsion droplets are separated from the metal particles, and wherein the laminar flow lasts for a time sufficient for the plurality of bubbles to attach to the metal particles;
releasing the combined fluid into a flotation tank; and
removing the metal particles to form a second clean metalworking fluid.

Clause 2. A method for removing metal particles from a contaminated metalworking fluid comprising emulsion droplets and metal particles, the method comprising:
pressurizing the contaminated metalworking fluid with gas in a pressurization vessel to provide an aerated metalworking fluid;

flowing the aerated metalworking fluid from the bottom of the pressurization fluid to a coagulation channel;

applying a shear force to the aerated metalworking fluid to separate the emulsion droplets from the metal particles;

reducing the pressure of the aerated metalworking fluid to provide a plurality of bubbles, wherein the reducing the pressure occurs after applying the shear force and while the emulsion droplets are separated from the metal particles;

flowing the aerated metalworking fluid in a laminar flow through the coagulation channel to a floatation tank, wherein the laminar flow lasts for a time sufficient for the plurality of bubbles to attach to the metal particles;

releasing the aerated metalworking fluid into the flotation tank; and removing the metal particles to provide a clean metalworking fluid.

Clause 3. The method of clause 1, wherein the contacting occurs within about 0.5 second or less after the releasing of the pressure of the aerated metalworking fluid.

Clause 4. The method of clause 1, wherein the wherein the flowing occurs within about 0.5 second or less after applying the shear force.

Clause 5. The method of clause 1, wherein the shear force is a hydraulic shear force.

Clause 6. The method of clause 5, wherein application of a hydraulic shear force comprises injecting the aerated metalworking fluid into a flow of contaminated metal working fluid in a direction perpendicular to the flow of contaminated metal working fluid.

Clause 7. The method of clause 2, wherein the reducing the pressure is about 0.5 second or less after applying the shear force.

Clause 8. The method of clause 2, wherein the reducing the pressure occurs within 0.5 second after applying the shear force.

Clause 9. The method of clause 1 or 2, wherein the shear force is a mechanically generated shear force.

Clause 10. The method of clause 1 or 2, wherein the time sufficient for the plurality of bubbles to attach to the metal particles is at least about 1.0 second.

Clause 11. The method of clause 1 or 2, wherein the metal particles have an average particle size of about 30 micron or less.

Clause 12. The method of clause 1, wherein the first clean metalworking fluid is pressurized with gas at about 3.5 bar to about 6.2 bar for about two minutes or longer.

Clause 13. The method of clause 2, wherein the clean metalworking fluid is pressurized with gas at about 3.5 bar to about 6.2 bar for about two minutes or longer.

Clause 14. The method of clause 1 or 2, wherein the aerated metalworking fluid and the contaminated metalworking fluid are flowed in a flow ratio in a range of 1:5 (v:v) to 1:1 (v:v).

Clause 15. The method of clause 1 or 2 wherein the metal particles are non-ferrous.

Clause 16. The method of clause 15, wherein the metal particles comprise one or more of copper, aluminum, nickel, lead, titanium, tungsten and molybdenum.

Clause 17. The method of clause 1 or 2, wherein the gas comprises atmospheric air.

Clause 18. The method of clause 1 or 2, wherein the gas is selected from nitrogen, oxygen, and ozone.

Clause 19. The method of clause 1 or 2, wherein the contaminated metalworking fluid comprises an anionic emulsifier.

Clause 20. The method of clause 1 or 2, wherein the contaminated metalworking fluid comprises a nonionic emulsifier.

Clause 21. The method of clause 1 or 2, wherein the contaminated metalworking fluid comprises an anionic emulsifier and a nonionic emulsifier.

Clause 22. The method of clause 21, wherein the nonionic emulsifier is present at about 0.1% wt. to 20% wt of the anionic emulsifier.

Clause 23. The method of clause 1 or 2, wherein the bubbles have a size in a range of from about 10 microns to about 50 microns.

Clause 24. The method of clause 1 or 2, wherein the contaminated metalworking fluid is an oil-in-water phase emulsion.

Clause 25. The method of clause 24, wherein the emulsion comprises emulsion droplets having a size in a range of about 10 microns to 1 micron.

Clause 26. The method of clause 1 or 2, wherein the contaminated metalworking fluid is a water-in-oil phase emulsion.

Clause 27. The method of clause 1 or 2, wherein the metalworking process is a metal forming or metal removal process.

Clause 28. The method of clause 1 or 2, wherein the coagulation channel is substantially straight.

Clause 29. The method of clause 1, wherein the amount of emulsifier in the second clean metalworking fluid is within about 0.1% v/v to about 15% v/v of the amount of emulsifier in the contaminated metalworking fluid.

Clause 30. The method of clause 2, wherein the amount of emulsifier in the clean metalworking fluid is within about 0.1% v/v to about 15% v/v of the amount of emulsifier in the contaminated metalworking fluid.

Clause 31. A system for removing particles from a contaminated metalworking fluid comprising:
  a pressurization tank;
  a mechanical shear device;
  a coagulation channel having a length sufficient to provide a laminar flow of a fluid through the coagulation chamber for at least about 1 second; and
  a flotation tank.

Clause 32. A system for removing particles from a contaminated metalworking fluid comprising:
  a pressurization tank;
  a hydraulic shear device;
  a coagulation channel having a length sufficient to provide a laminar flow of a fluid through the coagulation chamber for at least about 1 second; and
  a flotation tank.

Clause 33. The system of clause 32, wherein the hydraulic shear device comprises:
  an inner pipe;
  an outer pipe surrounding the inner pipe and approximately coaxial with the inner pipe;
  a first end cap and a second end cap, each sized to seal an end of the inner pipe;
  a rod having a first end and a second end and extending through the inner pipe and the through the first end cap, the second end of the rod being connected to the second end cap,
  wherein the rod is capable of pushing the end cap off of the second end of the inner pipe to release a first fluid flowing through the inner pipe in a direction perpendicular to a flow of a second fluid through the outer pipe, and wherein the rod is capable of pulling the end cap on the second end of the inner pipe to seal the flow of fluid out of the inner pipe through the second end.

Clause 34. The system of clause 32, wherein the hydraulic shear device comprises:

a pipe; and a nozzle for injecting a fluid perpendicular to the direction of the pipe.

Clause 35. The system of clause 31 or 32, wherein the coagulation channel is substantially straight.

Example 1: Dissolved Air Flotation (DAF) Test

A DAF test was performed with a used sample of Quakerol 111 SW to determine the effectiveness of DAF to improve cleanliness of the fluid. The results are shown in Table 1.

TABLE 1

| Measurement | Initial | Post DAF |
|---|---|---|
| Dirt count @ 8 micron, mg/L | 804 | 200 |
| Dirt count @ 1.2 micron, mg/L | 920 | 212 |
| Dirt count @ 0.45 micron, mg/L | 1150 | 800 |
| Conductivity, μS/cm | 970 | 885 |
| Aluminum, mg/L | 163 | 20 |
| Iron, mg/L | 23.0 | 7.4 |
| Chloride, mg/L | 108 | 61 |
| Sodium, mg/L | 27 | 19 |
| Calcium, mg/L | 33 | 15 |
| Copper, mg/L | 1.6 | 0.5 |
| Concentration | 6.0% | 6.0% |
| pH | 7.7 | 7.7 |

It will be appreciated by those skilled in the art that changes could be made to the exemplary embodiments shown and described above without departing from the broad inventive concepts thereof. It is understood, therefore, that this invention is not limited to the exemplary embodiments shown and described, but it is intended to cover modifications within the spirit and scope of the present invention as defined by the claims. For example, specific features of the exemplary embodiments may or may not be part of the claimed invention and various features of the disclosed embodiments may be combined. Unless specifically set forth herein, the terms "a", "an" and "the" are not limited to one element but instead should be read as meaning "at least one".

It is to be understood that at least some of the figures and descriptions of the invention have been simplified to focus on elements that are relevant for a clear understanding of the invention, while eliminating, for purposes of clarity, other elements that those of ordinary skill in the art will appreciate may also comprise a portion of the invention. However, because such elements are well known in the art, and because they do not necessarily facilitate a better understanding of the invention, a description of such elements is not provided herein.

Further, to the extent that the methods of the present invention do not rely on the particular order of steps set forth herein, the particular order of the steps should not be construed as limitation on the claims. Any claims directed to the methods of the present invention should not be limited to the performance of their steps in the order written, and one skilled in the art can readily appreciate that the steps may be varied and still remain within the spirit and scope of the present invention.

I claim:

1. A method for removing metal particles from a contaminated metalworking fluid comprising emulsion droplets and metal particles, the method comprising:

pressurizing the contaminated metalworking fluid with gas in a pressurization vessel to provide an aerated metalworking fluid;

flowing the aerated metalworking fluid from the bottom of the pressurization vessel to a coagulation channel;

applying a shear force to the aerated metalworking fluid to separate the emulsion droplets from the metal particles;

reducing the pressure of the aerated metalworking fluid to provide a plurality of bubbles, wherein the reducing the pressure occurs after applying the shear force and while the emulsion droplets are separated from the metal particles;

flowing the aerated metalworking fluid in a laminar flow through the coagulation channel to a floatation tank, wherein the laminar flow lasts for a time sufficient for the plurality of bubbles to attach to the metal particles;

releasing the aerated metalworking fluid into the flotation tank; and removing the metal particles to provide a clean metalworking fluid.

2. The method of claim 1, wherein the reducing the pressure is 0.5 second or less after applying the shear force.

3. The method of claim 1, wherein the shear force is a mechanically generated shear force.

4. The method of claim 1, wherein the time sufficient for the plurality of bubbles to attach to the metal particles is at least 1.0 second.

5. The method of claim 1, wherein at least one of (i)-(iii) applies:

(i) the metal particles have an average particle size of 30 micron or less;

(ii) metal particles are non-ferrous; or (iii) the metal particles comprise one or more of copper, aluminum, nickel, lead, titanium, tungsten and molybdenum.

6. The method of claim 1, wherein the clean metalworking fluid is pressurized with gas at 3.5 bar to 6.2 bar for about two minutes or longer.

7. The method of claim 1, wherein the aerated metalworking fluid and the contaminated metalworking fluid are flowed in a flow ratio in a range of 1:5 (v:v) to 1:1 (v:v).

8. The method of claim 1, wherein the gas comprises atmospheric air or the gas is selected from nitrogen, oxygen, and ozone.

9. The method of claim 1, wherein the contaminated metalworking fluid comprises:

(i) an anionic emulsifier, (ii) a nonionic emulsifier, or (iii) an anionic emulsifier and a nonionic emulsifier.

10. The method of claim 9, wherein the nonionic emulsifier of (iii) is present at 0.1% wt. to 20% wt of the anionic emulsifier.

11. The method of claim 1, wherein the bubbles have a size in a range of 10 microns to 50 microns.

12. The method of claim 1, wherein the contaminated metalworking fluid is an oil-in-water phase emulsion.

13. The method of claim 12, wherein the emulsion of (i) comprises emulsion droplets having a size in a range of 10 microns to 1 micron.

14. The method of claim 1, wherein the contaminated metalworking fluid is a water-in-oil phase emulsion.

15. The method of claim 1, wherein the metalworking process is a metal forming or metal removal process.

16. The method of claim 1, wherein the coagulation channel is substantially straight.

17. The method of claim 1, wherein the amount of emulsifier in the clean metalworking fluid is within 0.1% v/v to 15% v/v of the amount of emulsifier in the contaminated metalworking fluid.

* * * * *